United States Patent
Kim

(10) Patent No.: US 12,376,181 B2
(45) Date of Patent: Jul. 29, 2025

(54) METHOD AND APPARATUS FOR PERFORMING RECONFIGURATION FOR MOBILITY IN MOBILE WIRELESS COMMUNICATION SYSTEM

(71) Applicants: BLACKPIN INC., Seoul (KR); Soenghun Kim, Hanam-si (KR)

(72) Inventor: Soenghun Kim, Hanam-si (KR)

(73) Assignees: Blackpin Inc., Seoul (KR); Soenghun Kim, Hanam-si (KR)

( * ) Notice: Subject to any disclaimer, the term of this patent is extended or adjusted under 35 U.S.C. 154(b) by 0 days.

(21) Appl. No.: 18/893,346

(22) Filed: Sep. 23, 2024

(65) Prior Publication Data
US 2025/0106928 A1    Mar. 27, 2025

(30) Foreign Application Priority Data
Sep. 25, 2023    (KR) ........................ 10-2023-0128106

(51) Int. Cl.
| | | |
|---|---|---|
| *H04W 76/20* | (2018.01) | |
| *H04W 76/30* | (2018.01) | |
| *H04W 80/02* | (2009.01) | |

(52) U.S. Cl.
CPC ............ *H04W 76/20* (2018.02); *H04W 76/30* (2018.02); *H04W 80/02* (2013.01)

(58) Field of Classification Search
CPC ...... H04W 76/20; H04W 76/30; H04W 80/02
See application file for complete search history.

(56) References Cited

U.S. PATENT DOCUMENTS

| | | | |
|---|---|---|---|
| 2015/0043492 A1* | 2/2015 | Baek ................ | H04W 56/0005 370/329 |
| 2019/0349139 A1* | 11/2019 | Park ........................ | H04L 1/189 |
| 2021/0314805 A1* | 10/2021 | Sanda ............... | H04W 28/0236 |
| 2022/0046389 A1* | 2/2022 | Shrivastava .......... | H04L 5/0098 |
| 2023/0262823 A1* | 8/2023 | Madhurapantula ... | H04L 67/303 370/329 |
| 2023/0354066 A1* | 11/2023 | Liu ...................... | H04W 72/231 |
| 2023/0413364 A1* | 12/2023 | Huang ............ | H04W 36/00837 |
| 2024/0187145 A1* | 6/2024 | Hu ........................ | H04L 1/1825 |

OTHER PUBLICATIONS

3GPP TS 38.212 V17.6.0, 3rd Generation Partnership Project; Technical Specification Group Radio Access Network; NR; Multiplexing and channel coding (Release 17), Sep. 2023, 204 pages.
3GPP TS 38.213 V17.7.0, 3rd Generation Partnership Project; Technical Specification Group Radio Access Network; NR; Physical layer procedures for control (Release 17), Sep. 2023, 263 pages.

(Continued)

*Primary Examiner* — Will W Lin
(74) *Attorney, Agent, or Firm* — Fish & Richardson P.C.

(57) ABSTRACT

A method and an apparatus for LTM operations is provided. The method enables signaling overhead reduction and efficient operation by maximizing the common signaling while maintaining signaling flexibility. The method also enables adding and releasing configurations based on reference signaling and delta signaling. The method also provides technique for PDCP buffer management for synchronous reconfiguration based on LTM.

18 Claims, 19 Drawing Sheets

(56) References Cited

OTHER PUBLICATIONS

3GPP TS 38.214 V17.7.0, 3rd Generation Partnership Project; Technical Specification Group Radio Access Network; NR; Physical layer procedures for data (Release 17), 232 pages.
3GPP TS 38.321 V17.6.0, 3rd Generation Partnership Project; Technical Specification Group Radio Access Network; NR; Medium Access Control (MAC) protocol specification (Release 17), Sep. 2023, 253 pages.
3GPP TS 38.331 V17.6.0, 3rd Generatin Partnership Project; Technical Specificaiton Group Radio Access Network; NR; Radio Resource Control (RRC) protocol specification (Release 17), Sep. 2023, 1337 pages.
Ericsson, RRC running CR for LTM, 3GPP TSG-RAN WG2 Meeting #123-bis, R2-2310885, Oct. 9-13, 2023, 120 pages.
Intel Corporation, "38.306 running draftCR for introduction of NR further mobility enhancements," 3GPP TSG-RAN WG2 Meeting #123bis, R2-2310028, Oct. 9-13, 2023, 14 pages.
Intel Corporation, "38.331 running draftCR for UE capability of NR further mobility enhancements," 3GPP TSG-RAN WG2 Meeting #123bis, R2-2310029, Oct. 9-13, 2023, 4 pages.
Intel Corporation, "Discussion on L2/3 UE capabilities for NR further mobility enhancements," 3GPP TSG RAN WG2 Meeting #123bis, R2-2310033, Oct. 9-13, 2023, 3 pages.
Media Tek Inc. et al., "38.300 running CR for introduction of NR further mobility enhancements," 3GPP TSG-RAN WG2 Meeting #123bis, R2-2310360, Oct. 9-13, 2023, 30 pages.
ZTE Corporation et al., "Open issue list on 37.340 running CR," 3GPP TSG-RAN WG2 Meeting #123-bis, R2-2309832, Oct. 9-13, 2023, 2 pages.
ZTE Corporation et al., Summary of [Post123][054][feMob] Discussion on stage-2 signalling open issues, 3GPP TSG-RAN WG2 Meeting #123bis, R2-2309831, Oct. 9-13, 2023, 33 pages.

* cited by examiner

| R | R | R | C | S/U | Target Config ID | Oct 1 |
| R | R | R | R | Timing Advance Command || Oct 2 |
| Timing Advance Command ||||||  Oct 3 |
| R | TCI state ID ||||| Oct 4 |
| UL TCI state ID |||||| Oct 5 |
| Random Access Preamble index ||||| SS/PBCH index | Oct 6 |
| SS/PBCH index ||| PRACH Mask index ||| Oct 7 |

FIG.4B

METHOD AND APPARATUS FOR PERFORMING RECONFIGURATION FOR MOBILITY IN MOBILE WIRELESS COMMUNICATION SYSTEM

CROSS-REFERENCE TO RELATED APPLICATION

This application claims priority to and the benefit of Korean Patent Application No. 10-2023-0128106, filed on Sep. 25, 2023, the disclosure of which is incorporated herein by reference in its entirety.

BACKGROUND

Technical Field

The present disclosure relates to performing synchronous reconfiguration in wireless mobile communication system.

Related Art

To meet the increasing demand for wireless data traffic since the commercialization of 4th generation (4G communication systems), the 5th generation (5G system) is being developed. 5G system introduced millimeter wave (mmW) frequency bands (e. g. 60 GHz bands). In order to increase the propagation distance by mitigating propagation loss in the 5G communication system, various techniques are introduced such as beamforming, massive multiple—input multiple output (MIMO), full dimensional MIMO (FD-MIMO), array antenna, analog beamforming, and large-scale antenna. In addition, base station is divided into a central unit and plurality of distribute units for better scalability. To facilitate introduction of various services, 5G communication system targets supporting higher data rate and smaller latency.

When the UE passes from the coverage area of one cell to another cell, at some point a serving cell change need to be performed. Currently serving cell change is triggered by L3 measurements and is done by RRC signalling triggered Reconfiguration with Synch for change of PCell and PSCell, as well as release add for SCells when applicable, all cases with complete L2 (and L1) resets, and involving more latency, more overhead and more interruption time than beam switch mobility.

To meet the strict service requirements for the future mobile communication system, new mobility mechanism with less interruption time and less signaling overhead is required.

SUMMARY

Aspects of the present disclosure are to address the problems of current synchronous reconfiguration. The method of the terminal includes receiving a RRC comprising one or more second configuration and a first configuration, receiving a MAC CE comprising the identifier associated with a specific second configuration, determining one or more radio bearers based on comparison between a third configuration and a fourth configuration and releasing the one or more radio bearers. The third configuration is determined based on the first configuration and the specific second configuration.

BRIEF DESCRIPTION OF THE DRAWINGS

FIG. 4B illustrates format of the MAC CE.

DETAILED DESCRIPTION

Hereinafter, embodiments of the present disclosure will be described in detail with reference to the accompanying drawings. In addition, in the description of the present disclosure, if it is determined that a detailed description of a related known function or configuration may unnecessarily obscure the gist of the present disclosure, the detailed description thereof will be omitted. In addition, the terms to be described later are terms defined in consideration of functions in the present disclosure, which may vary according to intentions or customs of users and operators. Therefore, the definition should be made based on the content throughout this specification.

The terms used, in the following description, for indicating access nodes, network entities, messages, interfaces between network entities, and diverse identity information is provided for convenience of explanation. Accordingly, the terms used in the following description are not limited to specific meanings but may be replaced by other terms equivalent in technical meanings.

In the following descriptions, the terms and definitions given in the 3GPP standards are used for convenience of explanation. However, the present disclosure is not limited by use of these terms and definitions and other arbitrary terms and definitions may be employed instead.

In the present disclosure, followings are used interchangeably:
Terminal and UE and wireless device;
Information Element (IE) and set of parameters;
Parameter and field and IE;
Base station and GNB.

Figure 1A:
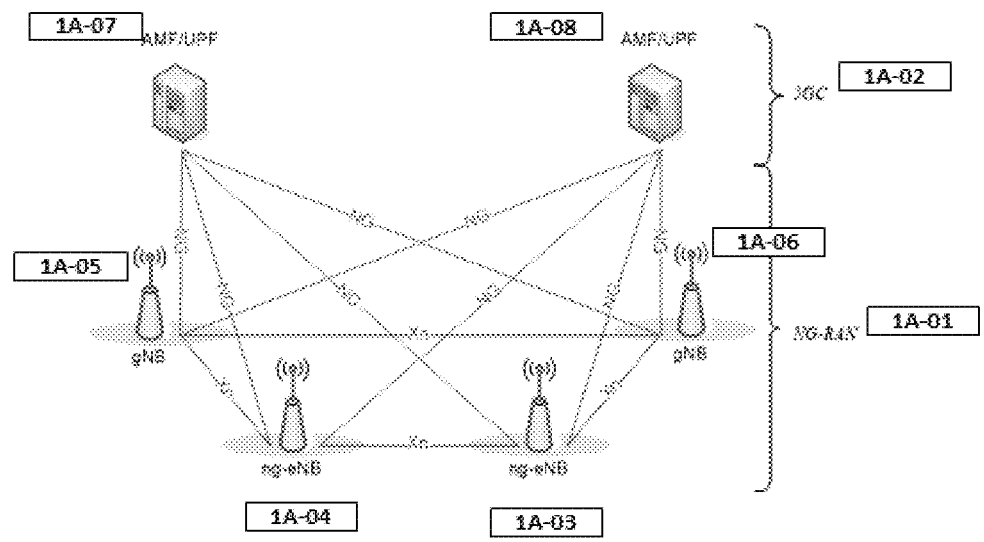
FIG. 1A is a diagram illustrating the architecture of an 5G system and a NG-RAN to which the disclosure may be applied.

FIG. 1A is a diagram illustrating the architecture of an 5G system and a NG-RAN to which the disclosure may be applied.

5G system consists of NG-RAN 1A-01 and 5GC 1A-02. An NG-RAN node is either:
1: a gNB, providing NR user plane and control plane protocol terminations towards the UE; or
1: an ng-eNB, providing E-UTRA user plane and control plane protocol terminations towards the UE.

The gNBs 1A-05 or 1A-06 and ng-eNBs 1A-03 or 1A-04 are interconnected with each other by means of the Xn interface. The gNBs and ng-eNBs are also connected by means of the NG interfaces to the 5GC, more specifically to the AMF (Access and Mobility Management Function) and to the UPF (User Plane Function). AMF 1A-07 and UPF 1A-08 may be realized as a physical node or as separate physical nodes.

A gNB 1A-05 or 1A-06 or an ng-eNBs 1A-03 or 1A-04 hosts the various functions listed below.
1: Functions for Radio Resource Management such as Radio Bearer Control, Radio Admission Control, Connection Mobility Control, Dynamic allocation of resources to UEs in uplink, downlink and sidelink (scheduling); and
1: IP and Ethernet header compression, uplink data decompression and encryption of user data stream; and
1: Selection of an AMF at UE attachment when no routing to an MME can be determined from the information provided by the UE; and
1: Routing of User Plane data towards UPF; and
1: Scheduling and transmission of paging messages; and
1: Scheduling and transmission of broadcast information (originated from the AMF or O&M); and
1: Measurement and measurement reporting configuration for mobility and scheduling; and
1: Session Management; and
1: QoS Flow management and mapping to data radio bearers; and
1: Support of UEs in RRC_INACTIVE state; and The AMF 1A-07 hosts the functions such as NAS signaling, NAS signaling security, AS security control, SMF selection, Authentication, Mobility management and positioning management.

The UPF 1A-08 hosts the functions such as packet routing and forwarding, transport level packet marking in the uplink, QoS handling and the downlink, mobility anchoring for mobility etc.

Figure 1B:
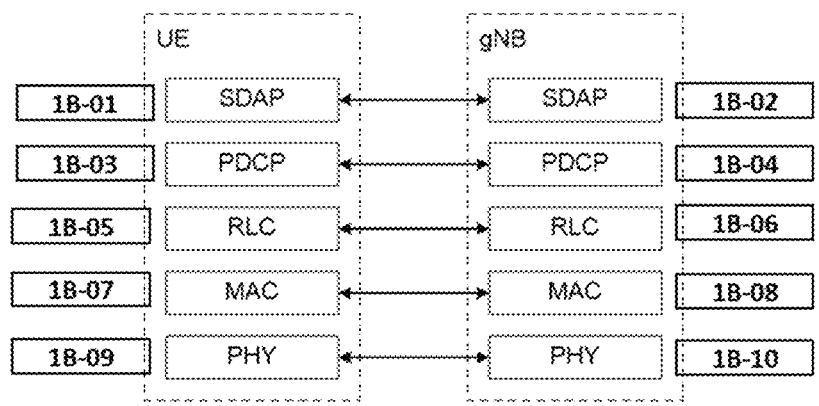
FIG. 1B is a diagram illustrating a wireless protocol architecture in an 5G system to which the disclosure may be applied.
Figure 1B:
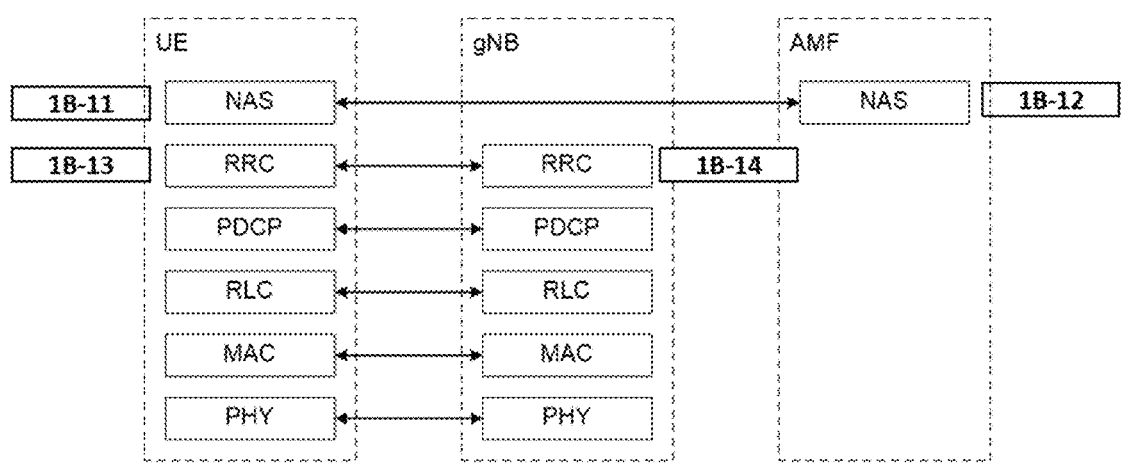

FIG. 1B is a diagram illustrating a wireless protocol architecture in an 5G system to which the disclosure may be applied.

User plane protocol stack consists of SDAP 1B-01 or 1B-02, PDCP 1B-03 or 1B-04, RLC 1B-05 or 1B-06, MAC 1B-07 or 1B-08 and PHY 1B-09 or 1B-10. Control plane protocol stack consists of NAS 1B-11 or 1B-12, RRC 1B-13 or 1B-14, PDCP, RLC, MAC and PHY.

Each protocol sublayer performs functions related to the operations listed below.

NAS: authentication, mobility management, security control etc.

RRC: System Information, Paging, Establishment, maintenance and release of an RRC connection, Security functions, Establishment, configuration, maintenance and release of Signalling Radio Bearers (SRBs) and Data Radio Bearers (DRBs), Mobility, QoS management, Detection of and recovery from radio link failure, NAS message transfer etc.

SDAP: Mapping between a QoS flow and a data radio bearer, Marking QoS flow ID (QFI) in both DL and UL packets.

PDCP: Transfer of data, Header compression and decompression, Ciphering and deciphering, Integrity protection and integrity verification, Duplication, Reordering and in-order delivery, Out-of-order delivery etc.

RLC: Transfer of upper layer PDUs, Error Correction through ARQ, Segmentation and re-segmentation of RLC SDUs, Reassembly of SDU, RLC re-establishment etc.

MAC: Mapping between logical channels and transport channels, Multiplexing/demultiplexing of MAC SDUs belonging to one or different logical channels into/from transport blocks (TB) delivered to/from the physical layer on transport channels, Scheduling information reporting, Priority handling between UEs, Priority handling between logical channels of one UE etc.

PHY: Channel coding, Physical-layer hybrid-ARQ processing, Rate matching, Scrambling, Modulation, Layer mapping, Downlink Control Information, Uplink Control Information etc.

Figure 2A:
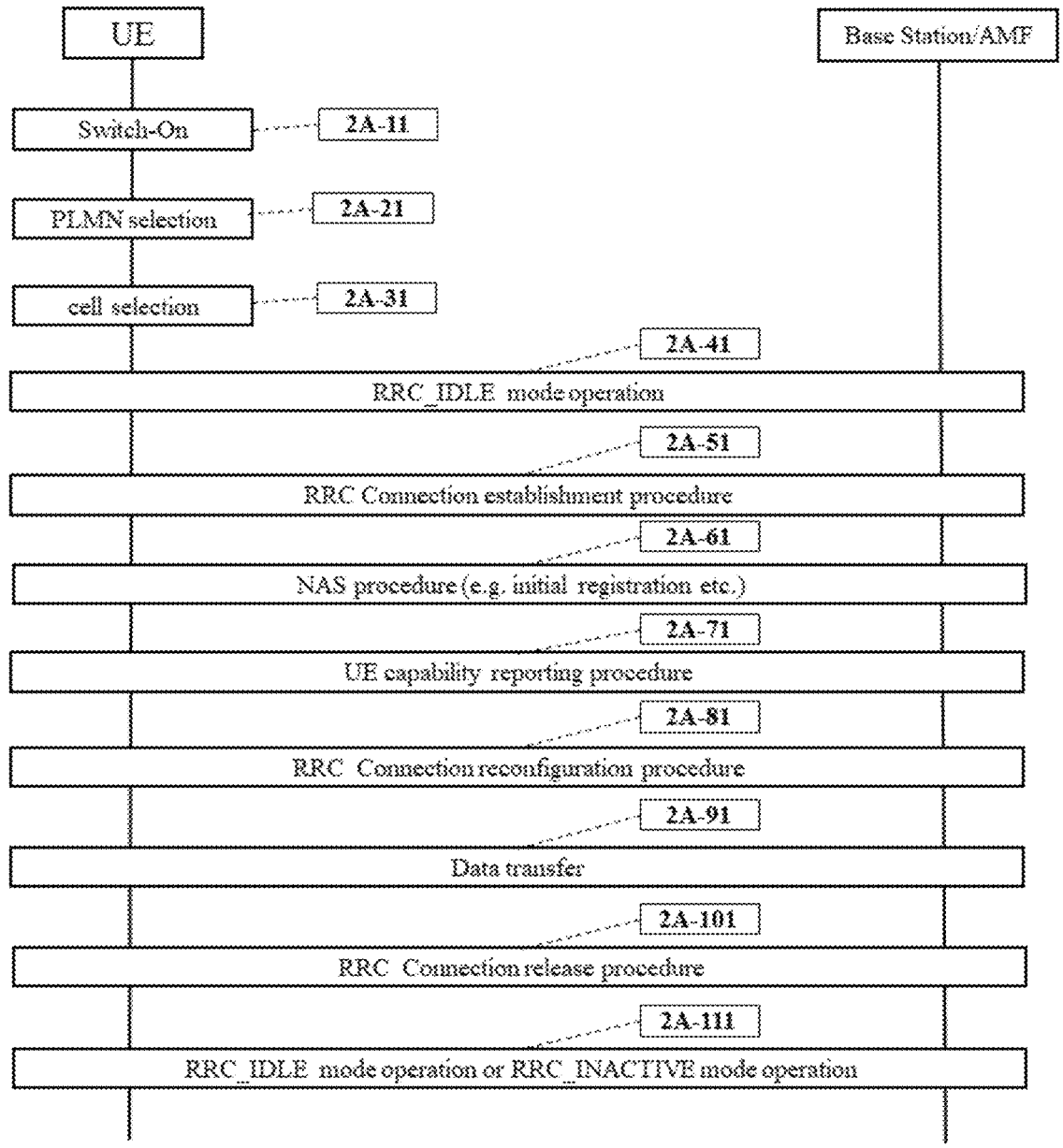
FIG. 2A illustrates overall operation of the UE and network.

FIG. 2A illustrates operation of the wireless device and network.

Upon switch-on of the wireless device (e.g. UE) at 2A-11, UE performs PLMN selection at 2A-21 to select the carrier that is provided by the PLMN that UE is allowed to register.

Then UE performs cell selection at 2A-31 to camp on a suitable cell.

Once camping on a suitable cell, UE performs RRC_IDLE mode operation at 2A-41 such as paging channel monitoring and cell reselection and system information acquisition.

UE performs RRC Connection establishment procedure at 2A-51 to perform e.g. NAS procedure such as initial registration with the selected PLMN.

After successful RRC connection establishment, UE performs NAS procedure at 2A-61 by transmitting a corresponding NAS message via the established RRC connection (e.g. SRB1).

The base station can trigger UE capability reporting procedure at 2A-71 before configuring data bearers and various MAC functions.

The base station and the UE perform RRC connection reconfiguration procedure at 2A-81. Via the procedure, data radio bearers and logical channels and various MAC functions (such as DRX and BSR and PHR and beam failure reporting etc) and various RRC functions (such as RRM and RLM and measurement etc) are configured.

The base station and the UE perform data transfer at 2A-91 via the established radio bearers and based on configured MAC functions and configured RRC functions.

If geographical location of UE changes such that e.g. the current serving cell is no longer providing suitable radio condition, the base station and the UE perform cell level mobility such as handover or conditional reconfiguration or lower layer triggered mobility.

When RRC connection is not longer needed for the UE because of e.g. no more traffic available for the UE, the base station and the UE performs RRC connection release procedure at 2A-101. The base station can transit UE state either to RRC_IDLE (if the data activity of the UE is expected low) or to RRC_INACTIVE (if the data activity of the UE is expected high).

The UE performs either RRC_IDLE operation or RRC_INACTIVE mode operation at 2A-111 until the next event to RRC connection establishment/resumption occurs.

Figure 2B:
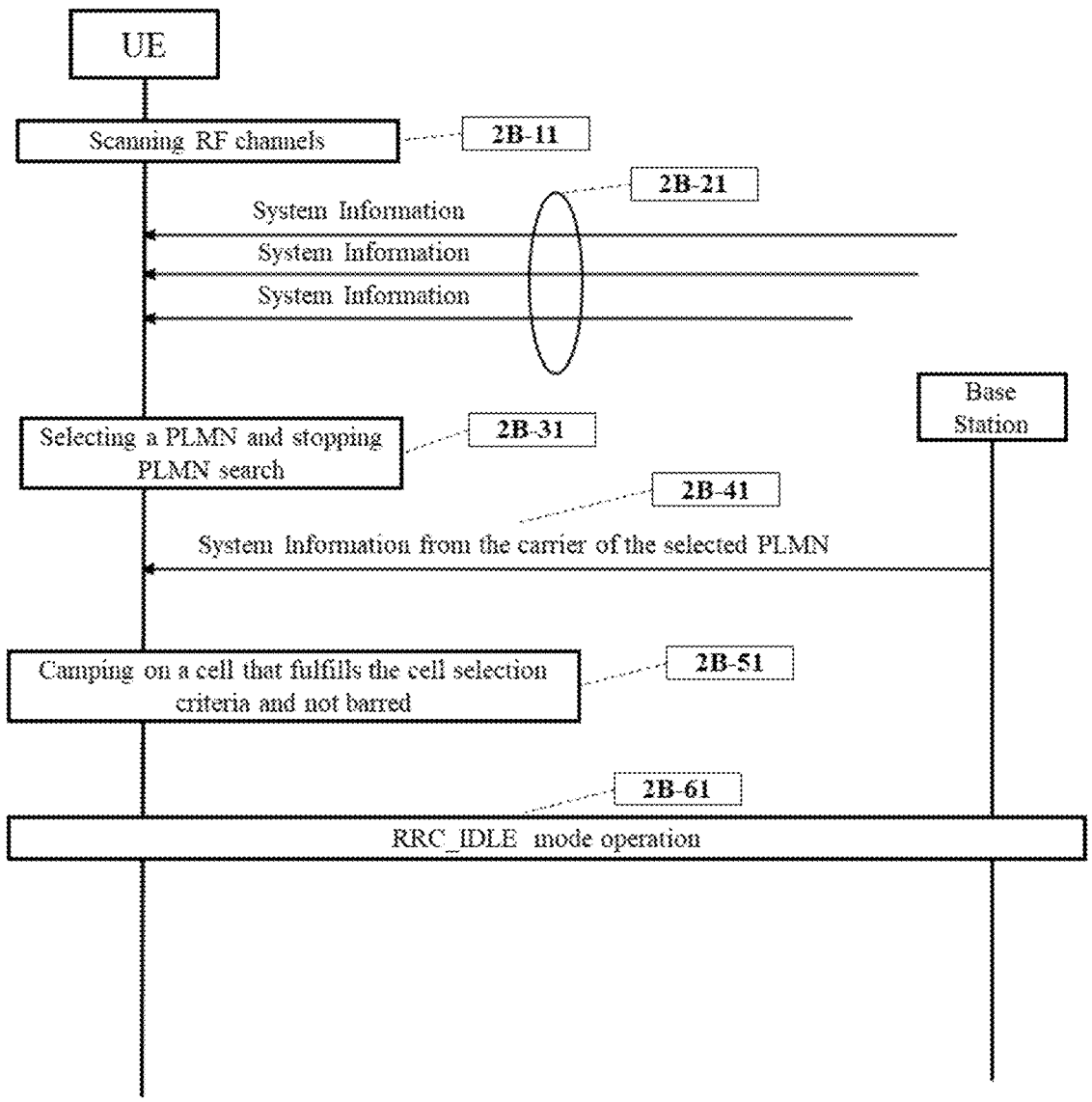
FIG. 2B illustrates operation of the UE regarding PLMN selection and cell selection and cell reselection.

FIG. 2B illustrates the operation of the UE regarding PLMN selection and cell selection and cell reselection.

For PLMN selection, the UE may scan all RF channels to find available PLMNs at 2B-11. On each carrier, the UE shall search for the strongest cell and read its system information at 2B-21, in order to find out which PLMN(s) the cell belongs to. Each found PLMN is considered as a high quality PLMN (but without the RSRP value) provided that the measured RSRP value is greater than or equal to −110 dBm.

The search for PLMNs may be stopped when the PLMN to which the UE can register is found at 2B-31.

Once the UE has selected a PLMN, the cell selection procedure shall be performed in order to select a suitable cell of that PLMN to camp on.

The UE performs measurement on detectable cells and receives system information from whichever detectable cells that system information is readable at 2B-41.

The UE consider cell selection criterion S is fulfilled when:

Srxlev>0 AND Squal>0 where, Srxlev is Cell selection RX level value (dB) and Squal is Cell selection quality value (dB). Srxlev is determined based on Measured cell RX level value (RSRP). Squal is determined based on Measured cell quality value (RSRQ).

The UE selects the cell that is part of the selected PLMN, and for which cell selection criteria are fulfilled, and of which cell access is not barred at 2B-51.

The UE camps on the selected cell. The UE perform RRC_IDLE mode operation at 2B-61 such as monitoring control channels to receive system information and paging and notification message.

Figure 2C:
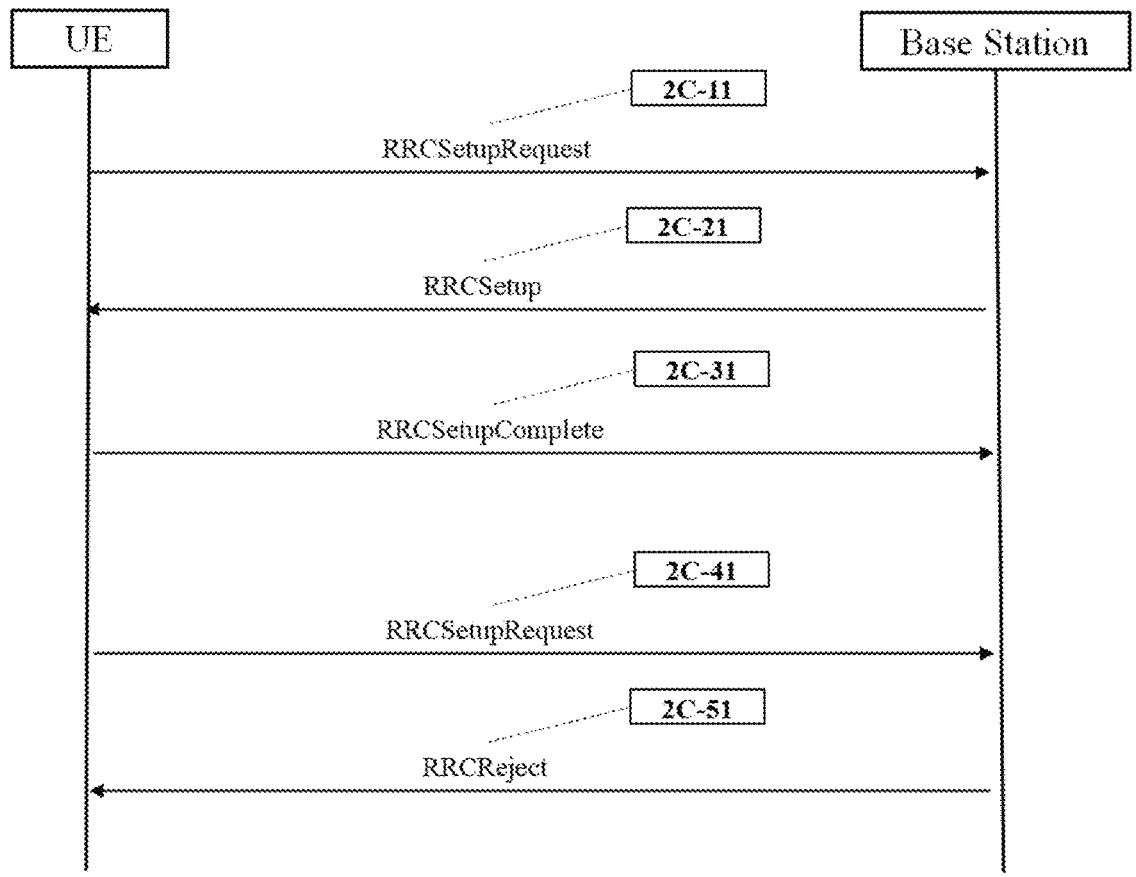
FIG. 2C illustrates RRC connection establishment procedure.

FIG. 2C illustrates RRC connection establishment procedure.

Successful RRC connection establishment procedure comprises:
1: transmission of RRCSetupRequest by the UE at 2C-11;
1: reception of RRCSetup by the UE at 2C-21;
1: transmission of RRCSetupComplete by the UE at 2C-31.

Unsuccessful RRC connection establishment procedure comprises:
1: transmission of RRCSetupRequest by the UE at 2C-41;
1: reception of RRCReject by the UE at 2C-51;

RRCSetupRequest comprises following fields and IEs:
1: ue-Identity field contains InitialUE-Identity IE which contains:
   2: ng-5G-S-TMSI-Part1 field containing a BIT STRING of 39 bit;
1: establishmentCause field contains EstablishmentCause IE which contains:
   2 enumerated value indicating either emergency, highPriorityAccess, mt-Access, mo-Signalling, mo-Data, mo-VoiceCall, mo-VideoCall, mo-SMS, mps-PriorityAccess, mcs-PriorityAccess etc RRCSetup comprises following fields and IEs:
1: radioBearerConfig field containing a RadioBearerConfig IE;
1: masterCellGroup field containing a CellGroupConfig IE.

RRCSetupComplete comprises following fields and IEs:
1: selectedPLMN-Identity field containing an integer indicating selected PLMN;
1: dedicatedNAS-Message field containing a DedicatedNAS-Message which may contain various NAS message;
1: ng-5G-S-TMSI-Part2 field containing a BIT STRING of 9 bit.

RRCSetupRequest is transmitted via CCCH/SRB0, which means that the base station does not identify UE transmitting the message based on DCI that scheduling the uplink transmission. The UE includes a field (ue-Identity) in the message so that the base station identify the UE. If 5G-S-TMSI is available (e.g. UE has already registered to a PLMN), the UE sets the field with part of the 5G-S-TMSI. If 5G-S-TMSI is not available (e.g. UE has not registered to any PLMN), the UE sets the field with 39-bit random value.

Upon reception of RRCSetup, UE configures cell group and SRB1 based on the configuration information in the RRCSetup. The UE perform following actions:
1: perform the cell group configuration procedure in accordance with the received masterCellGroup;
1: perform the radio bearer configuration procedure in accordance with the received radioBearerConfig;
1: if stored, discard the cell reselection priority information provided by the cellReselectionPriorities or inherited from another RAT;
1: enter RRC_CONNECTED;
1: stop the cell re-selection procedure;
1: consider the current cell to be the PCell;

The UE transmits to the base station RRCSetupComplete after performing above actions.

Figure 2D:
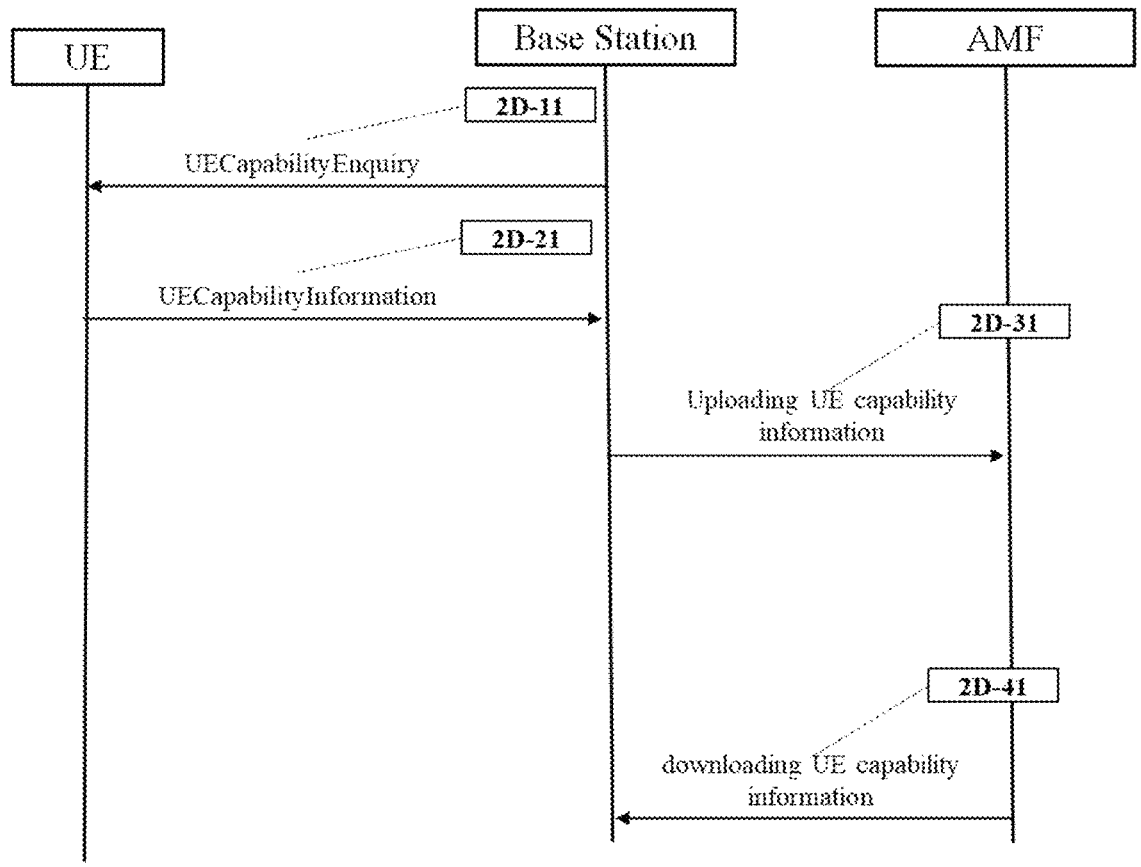
FIG. 2D illustrates UE capability transfer procedure.

The UE sets the contents of RRCSetupComplete message as follows:
1: set the ng-5G-S-TMSI-Value to ng-5G-S-TMSI-Part2;
1: set the selectedPLMN-Identity to the PLMN selected by upper layers from the plmn-IdentityInfoList;
1: include the s-NSSAI-List and set the content to the values provided by the upper layers;

FIG. 2D illustrates UE capability transfer procedure.

For network to configure the UE with appropriate configurations, the network needs to know the capability of the UE. For this end, the UE and the base station perform UE capability transfer procedure.

UE capability transfer procedure consists of exchanging UECapabilityEnquiry 2D-11 and UECapabilityInformation 2D-21 between the UE and the base station.

In the UECapabiliityEnquiry, the base station indicates which RAT is subject to capability reporting. UE transmits the capability information for the requested RAT in the UECapabilityInformation.

Once UECapabilityInformation is received, the capability information is uploaded to the AMF by the base station at 2D-31. When UE capability information is needed afterward, AMF provide it to the base station at 2D-41.

Figure 2E:
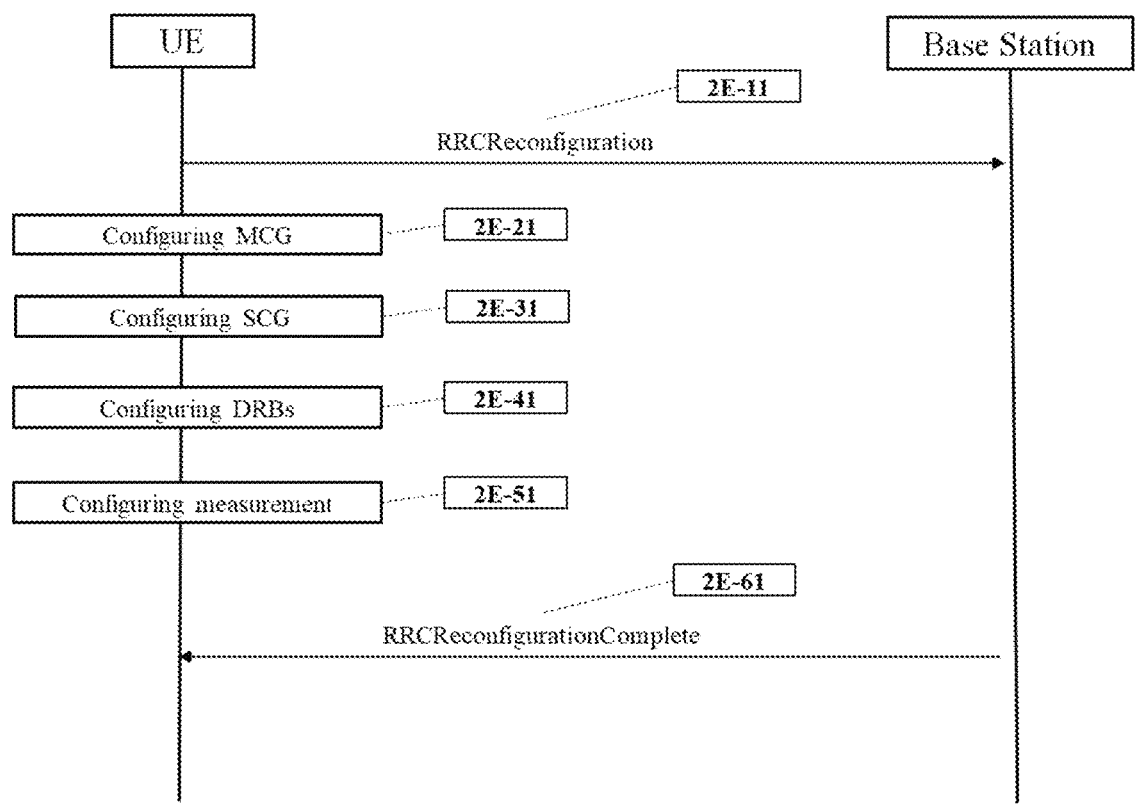
FIG. 2E illustrates RRC connection reconfiguration procedure.

FIG. 2E illustrates RRC connection reconfiguration procedure.

Based on the reported capability and other factors such as required QoS and call admission control etc, the base station performs RRC reconfiguration procedure with the UE.

RRC reconfiguration procedure is a general purposed procedure that are applied to various use cases such as data radio bearer establishment, handover, cell group reconfiguration, DRX configuration, security key refresh and many others.

RRC reconfiguration procedure consists of exchanging RRCReconfiguration at 2E-11 and RRCReconfigurationComplete at 2E-61 between the base station and the UE.

RRCReconfiguration may comprises following fields and IEs:
1: rrc-TransactionIdentifier field contains a RRC-TransactionIdentifier IE;

1: radioBearerConfig field contains a RadioBearerConfig IE;
   2: radioBearerConfig field comprises configuration information for SRBs and DRBs via which RRC messages and user traffic are transmitted and received;
1: secondaryCellGroup field contains a CellGroupConfig IE;
   2: secondaryCellGroup field comprises configuration information for secondary cell group;
   2: A cell group consists of a SpCell and zero or more SCells;
   2: Cell group configuration information comprises cell configuration information for SpCell/SCell and configuration information for MAC and configuration information for logical channel etc;
1: measConfig field contains a MeasConfig IE;
   2: measConfig field comprises configuration information for measurements that the UE is required to perform for mobility and other reasons.
1: masterCellGroup field contains a CellGroupConfig IE;
Upon reception of RRCReconfiguration, UE processes the IEs in the order as below. UE may:
1: perform the cell group configuration for MCG based on the received masterCellGroup at 2E-21;
1: perform the cell group configuration for SCG based on the received secondaryCellGroup at 2E-31;
1: perform the radio bearer configuration based on the received radioBearerConFIG. at 2E-41;
1: perform the measurement configuration based on the received measConFIG. at 2E-51;

After performing configuration based on the received IEs/fields, the UE transmits the RRCReconfigurationComplete to the base station at 2E-61. To indicate that the RRCReconfigurationComplete is the response to RRCReconfiguration, UE sets the TransactionIdentifier field of the RRCReconfigurationComplete with the value indicated in TransactionIdentifier field of the RRCReconfiguration.

Figure 2F:
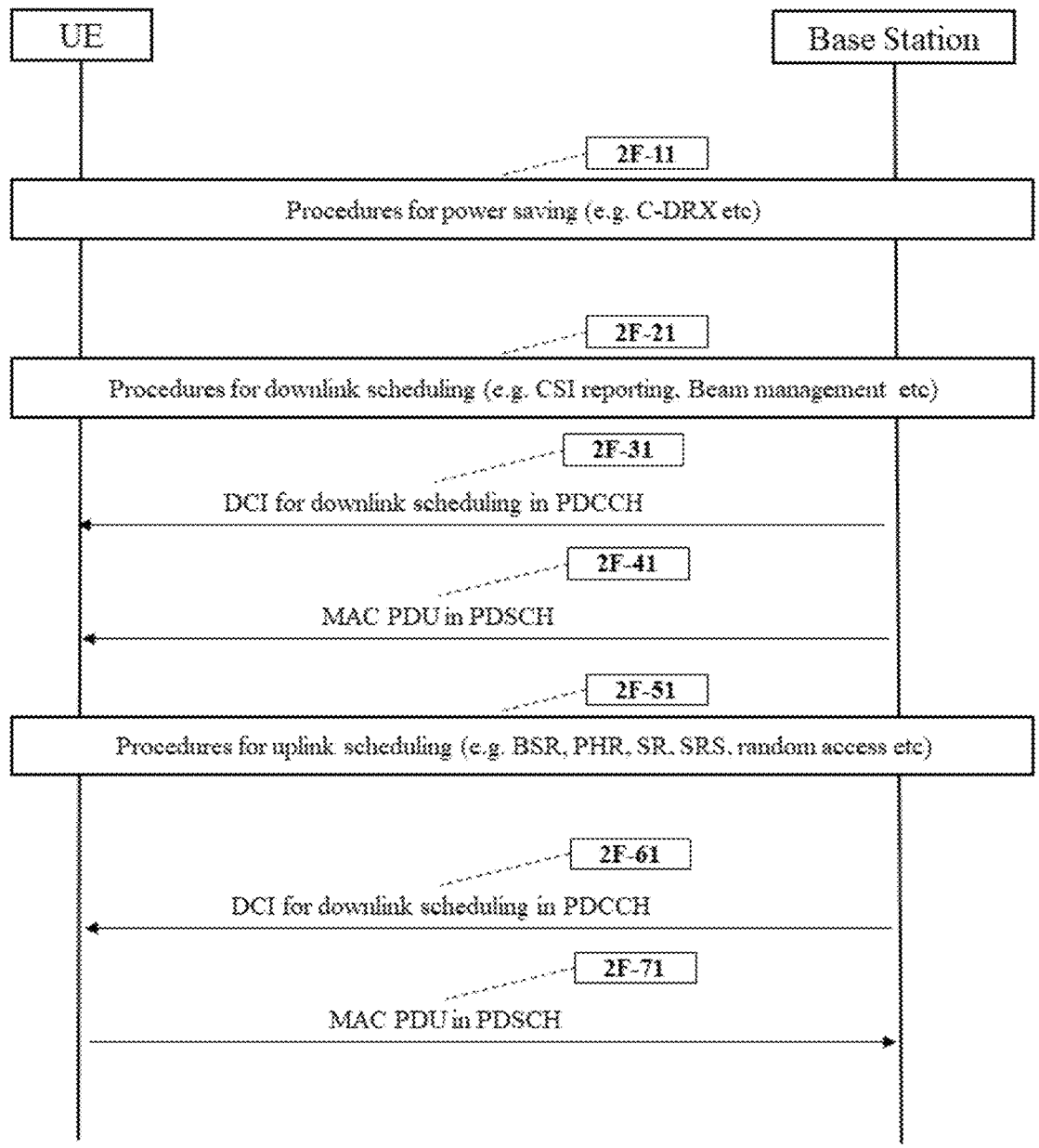
FIG. 2F illustrates data transfer procedure in RRC_CONNECTED state.

FIG. 2F illustrates data transfer procedure in RRC_CONNECTED state.

The UE and the base station may perform procedures for power saving such as C-DRX at 2F-11. The configuration information for C-DRX is provided to the UE within cell group configuration in the RRCReconfiguration.

The UE and the base station may perform various procedures for downlink scheduling at 2F-21 such as CSI reporting and beam management. The configuration information for CSI reporting is provided to the UE within cell group configuration in the RRCReconfiguration. Beam management is performed across RRC layer and MAC layer and PHY layer. Beam related information is configured via cell group configuration information within RRCReconfiguration. Activation and deactivation of beam is performed by specific MAC CEs.

Based on the reported CSI and downlink traffic for the UE, the base station determines the frequency/time resource and transmission format for downlink transmission. The base station transmits to the UE DCI containing downlink scheduling information via PDCCH at 2F-31. The base station transmits to the UE PDSCH corresponding to the DCI and containing a MAC PDU at 2F-41.

The UE and the base station may perform various procedure for uplink scheduling at 2F-51 such as buffer status reporting and power headroom reporting and scheduling request and random access. The configuration information for those procedures are provided to the UE in cell group configuration information in RRCReconfiguration.

Based on the uplink scheduling information reported by the UE, the base station determines the frequency/time resource and transmission format for uplink transmission. The base station transmits to the UE DCI containing uplink scheduling information via PDCCH at 2F-61. The base station transmits to the UE PDSCH corresponding to the DCI and containing a MAC PDU at 2F-71.

Figure 2G:
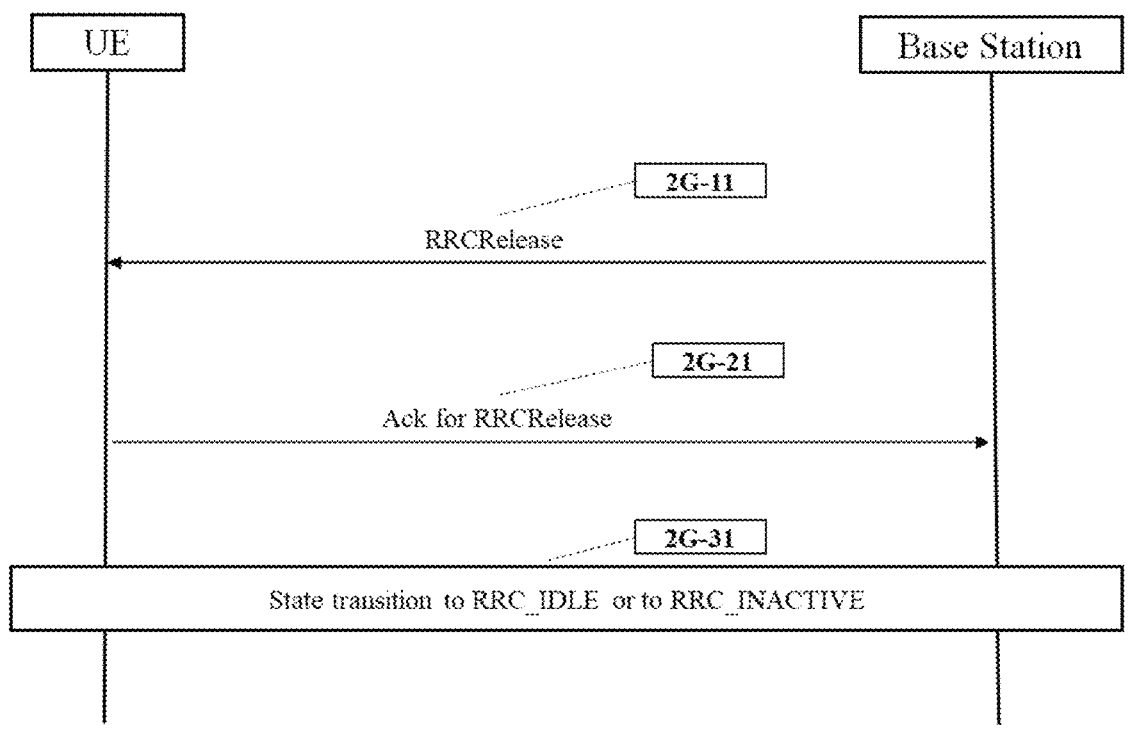
FIG. 2G illustrates RRC connection release procedure.

FIG. 2G illustrates RRC connection release procedure.

RRC connection release procedure comprises:
1: transmission of RRCRelease from the base station to the UE at 2G-11; and
1: transmission of acknowledgement for the RRCRelease from the UE to the base station at 2G-21; and
1: state transition from RRC_CONNECTED to either RRC_IDLE or RRC_INACTIVE at 2G-31.

The purpose of RRC connection release procedure is either to release RRC connection (state transition to RRC_IDLE) or to suspend RRC connection (state transition to RRC_INACTIVE).

RRC connection release procedure may perform, in addition to state transition, various roles e.g., providing redirection information or providing cell reselection priorities.

The RRCRelease may comprise following fields for redirection:
1: redirectedCarrierInfo field comprises RedirectedCarrierInfo IE;
   2: RedirectedCarrierInfo IE comprises either CarrierInfoNR IE or RedirectedCarrierInfo-EUTRA IE;
      3: CarrierInfoNR IE comprises ARFCN-ValueNR IE and SubcarrierSpacing IE; The UE may perform cell selection on the carrier indicated by CarrierInfoNR IE or RedirectedCarrierInfo-EUTRA IE.

The RRCRelease may comprise following fields to configure cell reselection priority:
1: cellReselectionPriorities field comprises CellReselectionPriorities IE;
   2: CellReselectionPriorities IE comprises:
      3: FreqPriorityListNR IE;
      3: t320 field indicates a timer value for cell reselection priority validity; During idle mode mobility, the UE applies the CellReselectionPriorities until T320 expires or stops.

The RRCRelease may comprises following fields/IEs to transition UE to RRC_INACTIVE state:
1: suspendConfig field comprises SuspendConfig IE;
   2: fullI-RNTI field comprises I-RNTI-Value IE;
   2: shortI-RNTI field comprises ShortI-RNTI-Value IE;
   2: ran-PagingCycle field comprises PagingCycle IE;
   2: ran-NotificationAreaInfofield comprises RAN-NotificationAreaInfo IE;
   2: t380 field comprises PeriodicRNAU-TimerValue;
   2: nextHopChainingCount field comprises NextHopChainingCount IE.
   2: ran-ExtendedPagingCycle field comprises ExtendedPagingCycle IE.

To transit the UE to RRC_INACTIVE, the base station includes SuspendConfig IE in the RRCRelease. To transit the UE to RRC_IDLE, the base station does not include SuspendConfig IE in the RRCRelease.

Figure 2H:
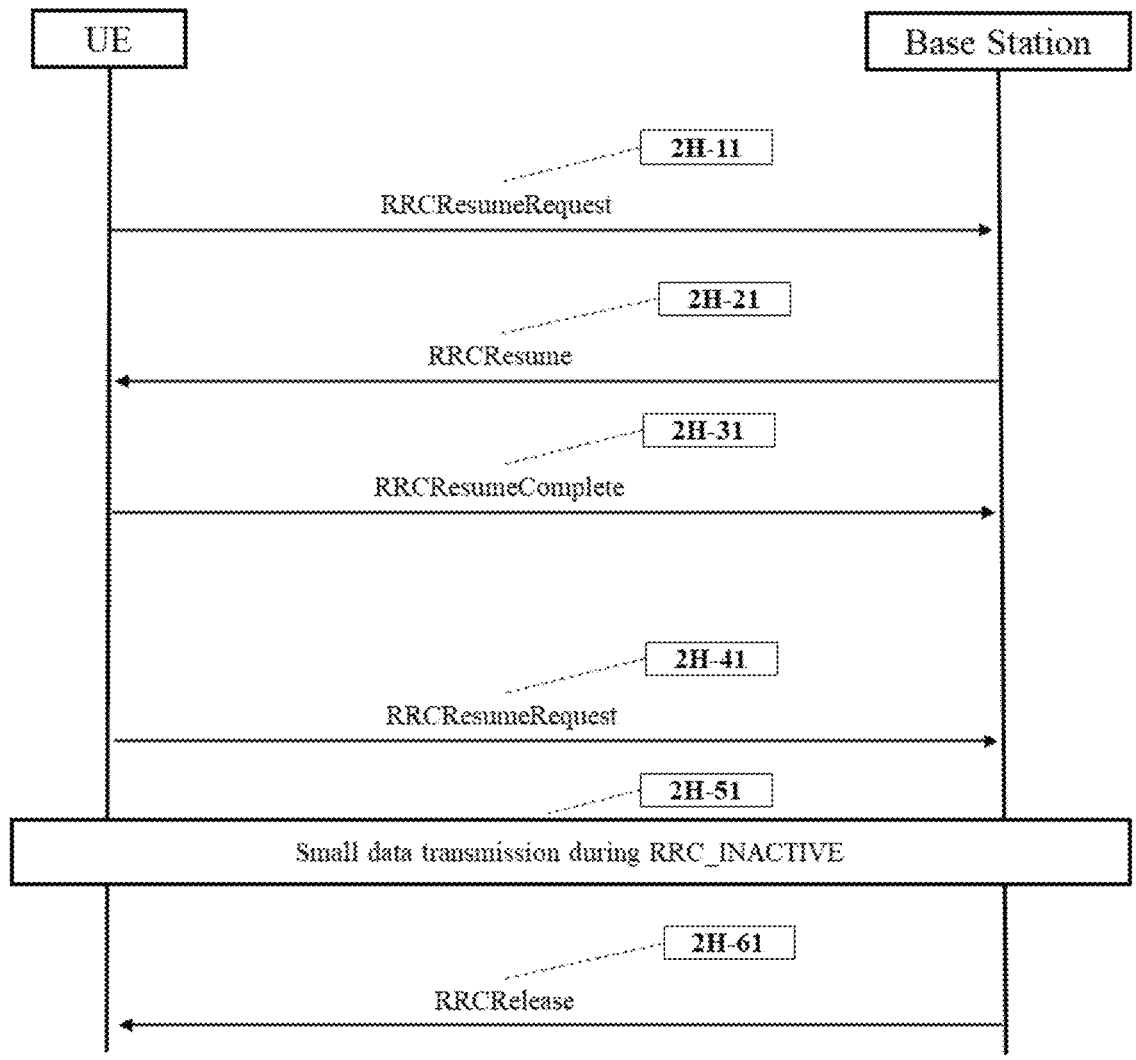
FIG. 2H illustrates RRC connection resumption procedure.

Upon reception of RRCRelease, UE may:
1: delay the actions caused by RRCRelease 60 ms from the moment the RRCRelease message was received or optionally when lower layers indicate that the receipt of the RRCRelease message has been successfully acknowledged, whichever is earlier;

1: store the cell reselection priority information provided by the cellReselectionPriorities and start T320;
1: if the RRCRelease includes suspendConfig:
   2: reset MAC and release the default MAC Cell Group configuration;
   2: apply the received suspendConfig except the received nextHopChainingCount;
   2: if the sdt-Config is configured:
      3: for each of the DRB in the sdt-DRB-List, consider the DRB to be configured for SDT;
      3: if sdt-SRB2-Indication is configured, consider the SRB2 to be configured for SDT;
      3: re-establish the RLC entity for each RLC bearer that is not suspended;
      3: trigger the PDCP entity to perform SDU discard for SRB1 and SRB2;
      3: if sdt-MAC-PHY-CG-Config is configured, configure the PCell with the configured grant resources for SDT and start the cg-SDT-Time-AlignmentTimer;
   3: if srs-PosRRC-Inactive is configured, apply the configuration and instruct MAC to start the inactive-PosSRS-TimeAlignmentTimer;
   2: re-establish RLC entities for SRB1;
   2: stop the timer T319 if running;
   2: store in the UE Inactive AS Context the nextHopChainingCount received in the RRCRelease message, the current KgNB and KRRCint keys, the ROHC state, the EHC context(s), the UDC state, the stored QoS flow to DRB mapping rules, the application layer measurement configuration, the C-RNTI used in the source PCell, the cellIdentity and the physical cell identity of the source PCell, the spCellConfigCommon within ReconfigurationWithSync of the NR PSCell (if configured) and all other parameters configured except for:
      3: parameters within ReconfigurationWithSync of the PCell;
      3: parameters within ReconfigurationWithSync of the NR PSCell, if configured;
      3: parameters within MobilityControlInfoSCG of the E-UTRA PSCell, if configured;
      3: servingCellConfigCommonSIB;
   2: suspend all SRB(s) and DRB(s) and multicast MRB(s), except SRB0 and broadcast MRBs;
   2: indicate PDCP suspend to lower layers of all DRBs and multicast MRBs;
   2: start timer T380, with the timer value set to t380;
   2: indicate the suspension of the RRC connection to upper layers;
   2: enter RRC_INACTIVE and perform cell selection;
>1: else (if the RRCRelease does not include suspendConfig):
   2: perform the actions upon going to RRC_IDLE;

FIG. 2H illustrates RRC connection resumption procedure.

RRC connection resume procedure, in case of state transition from RRC_INACTIVE to RRC_CONNECTED, consists of RRC message exchange between the UE and the base station: RRCResumeRequest 2H-11 and RRCResume 2H-21 and RRCResumeComplete 2H-31.

RRC connection resume procedure, in case of small data transmission without state transition, consists of RRC message exchange between the UE and the base station: RRCResumeRequest 2H-41 and RRCRelease 2H-51.

RRC connection resume procedure is triggered by the UE due to various reasons. For example, RRC connection resume procedure for state transition is triggered periodically (upon T380 expiry) or event-driven (upon cell change to different RAN area) or data driven (upon uplink or downlink data arrival). RRC connection resume procedure for small data transmission is triggered only if channel condition is above specific threshold and the amount of data is expected to be relatively small.

Upon initiation of RRC connection resume procedure, the UE performs some preliminary operation such as starting timers such as T319 (for supervising the procedure) and timeAlignmentTimer (for uplink timing alignment) and applying common channel configuration (for transmission of RRCResumeRequest). Then UE transmits RRCResumeRequest 2H-11 or 2H-41 to the base station. The message comprises the UE identifier which can be used by the base station to identify the UE context where RRC connection information of the UE is stored.

When the base station determines that UE needs to be in RRC_CONNECTED state, the base station transmits RRCResume. Upon reception of RRCResume 2H-21, the UE restores whole UE context based on the stored context at the time of RRCRelease reception and the received information in the RRCResume.

If the RRC connection resume procedure is triggered for small data transmission, the UE and the base station may perform data transfer during RRC connection resume procedure 2H-51. When the base station determines that small data transmission is finished, the base station transmit RRCRelease 2H-61.

Figure 3A:
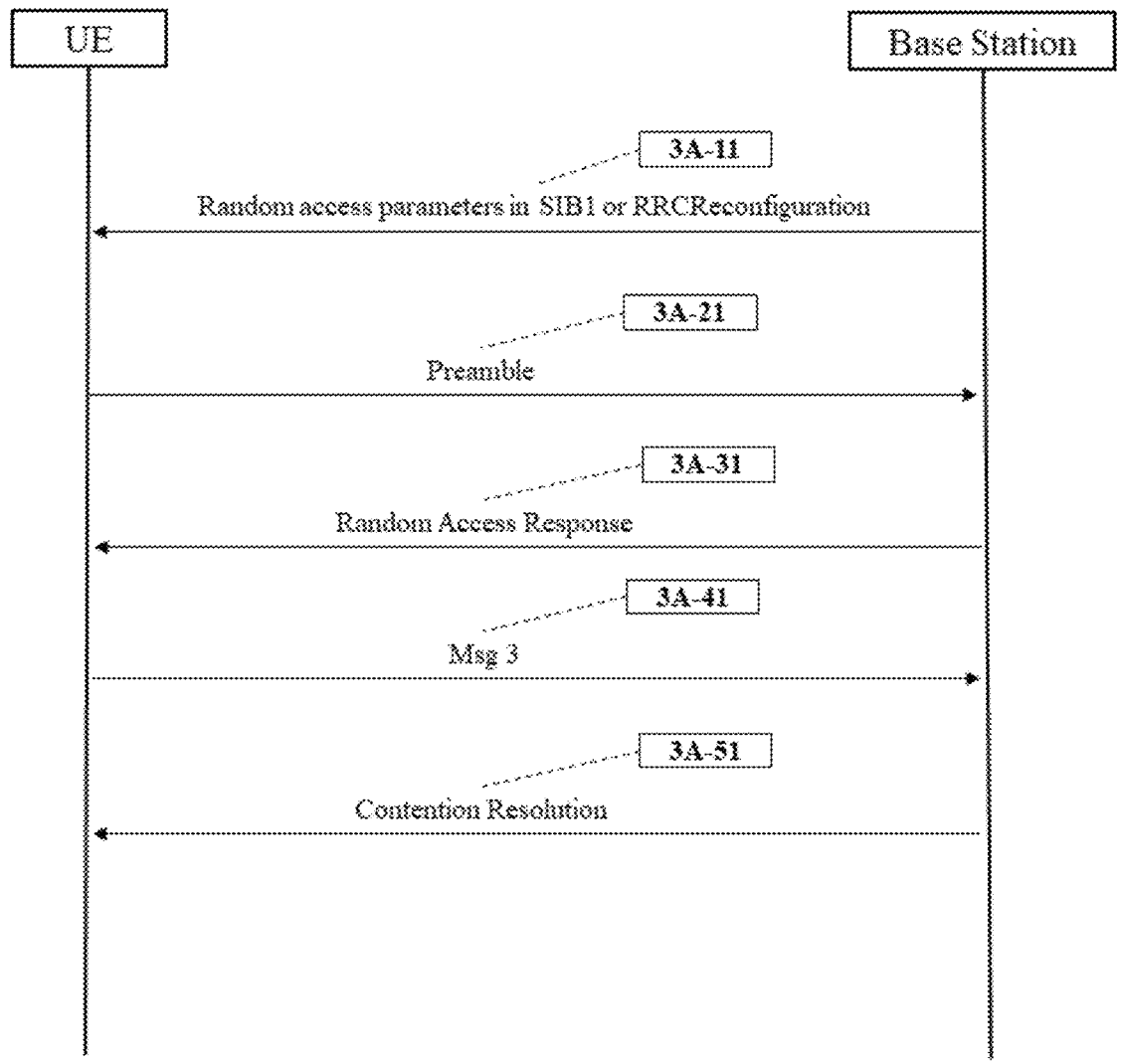
FIG. 3A illustrates random access procedure.

FIG. 3A illustrates random access procedure.

Random access procedure enables the UE to align uplink transmission timing, and indicate the best downlink beam, and transmit a MAC PDU that may contain CCCH SDU (e.g. RRCSetupRequest).

Random access procedure comprises preamble transmission 3A-21, random access response reception 3A-31, Msg 3 transmission 3A-41 and contention resolution 3A-51.

Parameters for random access procedure are provided in SIB1 (in case of initial access) or in RRCReconfiguration (in case of handover) 3A-11.

Random access procedure may be triggered by a number of events such as initial access from RRC_IDLE (e.g. RRC connection establishment procedure), DL or UL data arrival, request by RRC upon synchronous reconfiguration (e.g. handover) and RRC Connection Resume procedure from RRC_INACTIVE etc.

When the random access procedure is initiated, the UE may perform following actions in order:
   1: flush the buffer for Msg 3;
   1: initialize the counters for preamble transmission and power ramping;
   1: select the uplink carrier for performing the random access procedure based on a rsrp threshold (e.g. rsrp-ThresholdSSB-SUL);
   1: select the set of Random Access resources applicable to the current Random Access procedure;
   1: select a SSB based on a rsrp threshold (e.g. rsrp-ThresholdSSB); a SSB corresponds to a downlink beam;
   1: select a random access preamble group based on the pathloss of the selected SSB and the potential Msg3 size and various parameters (e.g. ra-Msg3SizeGroupA, preambleReceivedTargetPower, msg3-DeltaPreamble, messagePowerOffsetGroupB etc); Preamble group selection enables the UE to request bigger uplink grant for Msg 3 transmission if channel condition is good enough and the potential Msg 3 size is above a certain threshold;
1: select a random access preamble randomly with equal probability from the random access preambles associated with the selected SSB and the selected random access preamble group;
1: determine the next available PRACH occasion from the PRACH occasions corresponding to the selected SSB;
1: determine the transmission power of the preamble;
  2: preamble transmission power=pathloss+preambleReceivedTargetPower+DELTA_PREAMBLE+(PREAMBLE_POWER_RAMPING_COUNTER−1)×PREAMBLE_POWER_RAMPING_STEP+POWER_OFFSET_2STEP_RA
1: transmit the preamble in the determined PRACH occasion with the determined transmission power;
1; start ra-ResponseWindow;
1: monitor the PDCCH of the SpCell for Random Access Response(s) identified by the RA-RNTI while the ra-ResponseWindow is running;
1: receive Random Access Response contains a MAC subPDU with Random Access Preamble identifier corresponding to the transmitted preamble;
1: process the received Timing Advanced Command and the received UL grant;
1: transmit a Msg 3 based on the received UL grant;
  2: Msg 3 may contain e.g. CCCH SDU such as RRCSetupRequest or RRCResumeRequest;
1: start ra-ContentionResolutionTimer;
1: monitor the PDCCH while the ra-ContentionResolutionTimer is running;
1: consider Contention Resolution successful when MAC PDU containing a UE Contention Resolution Identity MAC CE is received;
1: consider the Random Access procedure successfully completed.

Figure 3B:
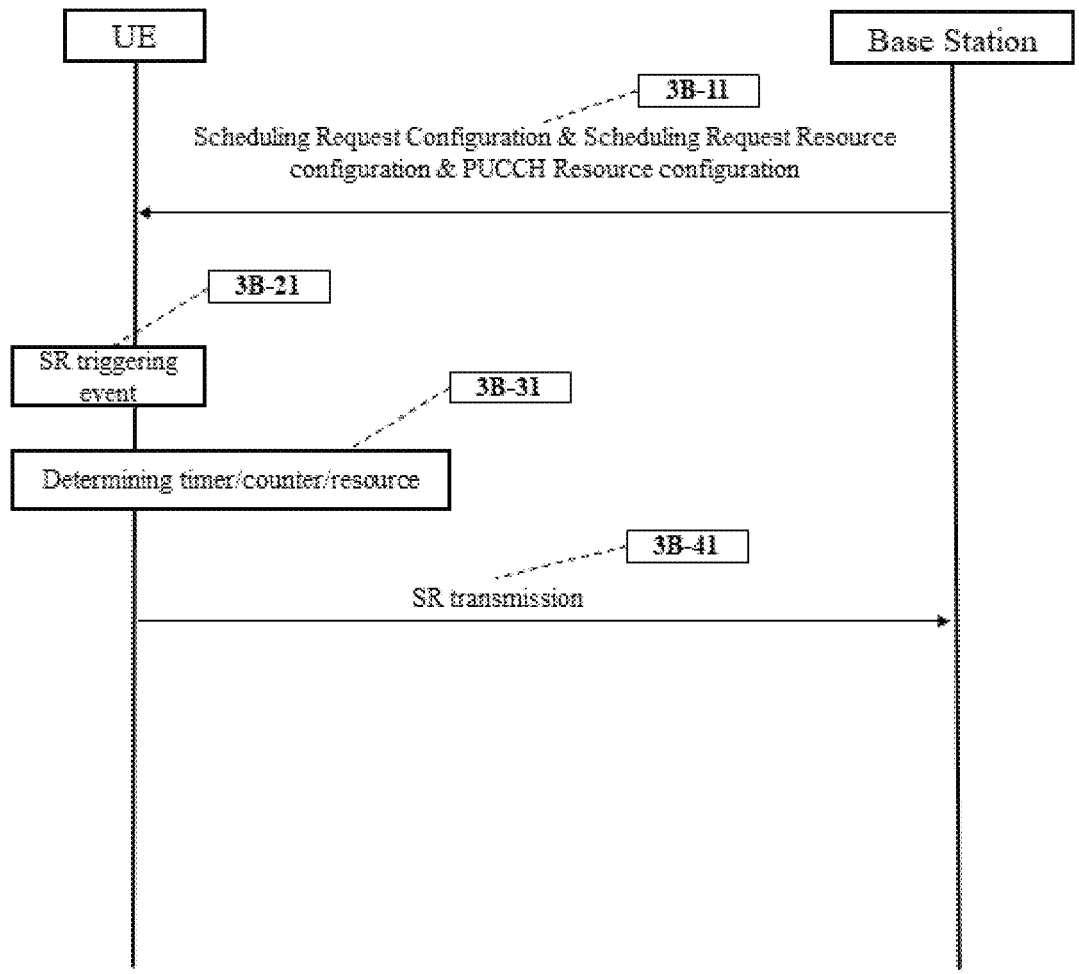
FIG. 3B illustrates scheduling request procedure based on dedicate scheduling request resource.

FIG. 3B illustrates scheduling request procedure based on dedicate scheduling request resource.

Unlike downlink traffic, the scheduler in the base station does not know when UE needs to be scheduled for uplink transmission. To enable uplink scheduling, the UE can be configured with scheduling request resource. When uplink resource is required for the UE, the UE can transmit a one-bit signal on the scheduling request resource based on the scheduling request procedure.

The base station provides to the UE configuration information for dedicate scheduling request procedure in RRCReconfiguration at 3B-11.

The configuration information comprises four main components: mapping information between events and the counter/timer/time resource/frequency resource, configuration information for counter/timer, configuration information for time resource, and configuration information for frequency resource.

One or more instances of configuration information on counter/timer (e.g. SchedulingRequestToAddMod) can be provided to the UE; each of them is associated with an identifier (e.g.schedulingRequestId). An initial value for counter (e.g. sr-TransMax) defines the number of consecutive times for SR transmission that is allowed. The timer (sr-Prohibittimer) defines the minimum time duration between the consecutive SR transmission.

One or more instances of configuration information on scheduling request resource (e.g. SchedulingRequestResourceConfig) can be provided to the UE; each of them is associated with an identifier (schedulingRequestID). The configuration information further comprises time domain information for the resource (e.g. periodicityAndOffset) and the identifier of the associated timer/counter (schedulingRequestResourceId) and the identifier of the associated frequency domain resource (PUCCH-ResourceId).

One or more instances of configuration information on PUCCH resource (e.g. PUCCH-Resource) can be provided to the UE; each of them is associated with an identifier (e.g. PUCCH-ResourceId). The configuration information comprises identifier of PRB where the PUCCH resource starts and an indication whether intra-slot frequency hopping is enabled.

The base station can indicate UE which counter/timer shall be used for which SR triggering event by binding the SR triggering event with a schedulingRequestId.

SR triggering event can be: data arrival in logical channel, SCell beam failure recovery, positioning measurement gap activation/deactivation request etc.

When an SR triggering event occurs at 3B-21, the UE determines the associated counter/timer based on the mapping information between SR triggering event and schedulingRequestId. Based on the determined schedulingRequestID, the UE determines the associated PUCCH-Resource and the associated SchedulingRequestResource at 3B-31; more specifically, the UE determines that the SchedulingRequestResource of which configuration information comprises schedulingRequestID is the SchedulingRequestResource associated with the timer/counter identified by the schedulingRequestID.

The UE transmits the SR at 3B-41:
1: in the time/frequency resource determined from SchedulingRequestResource associated with the schedulingRequestId; and
1: based on the prohibit timer and the initial counter value determined from the schedulingRequestId.

SchedulingRequestToAddMod and SchedulingRequestResource have one to one relationship between them.

In the following, information elements, fields, messages and procedures etc related to the disclosure are briefly explained.

RRCReconfiguration message is the command to modify an RRC connection. It may convey information for measurement configuration, mobility control, radio resource configuration (including RBs, MAC main configuration and physical channel configuration) and AS security configuration. RRCReconfiguration containing ReconfigurationWithsync is the command to perform L3 message based synchronous reconfiguration (e.g. handover).

RRCReconfiguration containing LTM_Config is used to provide the candidate configurations for L2 message based synchronous reconfiguration (e.g. LTM Cell Switch).

RRCReconfiguration includes following fields:
radioBearerConfig (parameters for PDCP and SDAP for one or more radio bearers);
dedicatedSIB1-Delivery; This field is used to transfer SIB1 to the UE; UE applies this field after synchronous reconfiguration is completed.
otherConfig;
spCellConfig (e.g. parameters for the target SpCell):
  reconfigurationWithSync:
    spCellConfigCommon (e.g. ServingCellConfigCommon for target SpCell);
    newUE-Identity (C-RNTI to be used in the target SpCell);
    t304 (e.g., supervision timer for synchronous reconfiguration);

rach-ConfigDedicated (e.g., dedicate random access parameters to be used for the reconfiguration with sync);

spCellConfigDedicated (e.g. ServingCellConfig for target SpCell);

LTM-Config (configuration information related to L2SR):
ltm-ReferenceConfiguration (containing embedded RRCReconfiguration);
ltm-CandidateToReleaseList (containing one or more LTM-CandidateId);
ltm-CandidateToAddModList (containing one or more LTM-CandidateToAddMod);
ltm-CSI-ResourceConfigToAddModList (containing one or more LTM-CSI-ResourceConfig);
ltm-CSI-ResourceConfigToReleaseList (containing one or more LTM-CSI-ResourceConfigId).

The LTM-CandidateToAddMod contains LTM candidate configurations to add or modify. It could be either delta configuration or complete configuration.

This IE contains one or more LTM-Candidate IEs. Each LTM-Candidate IE contains following fields/IEs:
ltm-CandidateId field contains LTM-CandidateId, that identify the LTM-Candidate IE;
ltm-CandidateConfig field contains an embedded RRCReconfiguration; The embedded RRCReconfiguration is applied when L2SR towards the SpCell of this LTM candidate configuration occurs;
ltm-ConfigComplete field indicates whether the LTM candidate configuration within ltm-CandidateConfig is a complete configuration and thus the UE shall not use the LTM reference configuration within the field ltm-ReferenceConfiguration;
ltm-EarlyUL-SyncConfig field contains random access related parameters;
ltm-NoResetID contains an integer indicating whether the UE should perform specific layer 2 operations relating to buffer management and retransmissions.

The IE ServingCellConfigCommon is used to configure cell specific parameters of a UE's serving cell. The IE contains parameters which a UE would typically acquire from SSB, MIB or SIBs when accessing the cell from IDLE. This IE contains following fields/IEs:
physCellId field includes information corresponding to an integer. This field identifies the physical cell identity (PCI) of the serving cell;
downlinkConfigCommon field includes common downlink configuration of the serving cell, including the frequency information configuration and the initial downlink BWP common configuration;
uplinkConfigCommon field contains common uplink configuration of the serving cell, including the frequency information configuration and the initial uplink BWP common configuration;
n-TimingAdvanceOffset field indicates the N_TA-Offset to be applied for all uplink transmissions on this serving cell;

The IE ServingCellConfigCommonSIB is used to configure cell specific parameters of a UE's serving cell in SIB1. The ServingCellConfigCommonSIB contains downlinkConfigCommon field and uplinkConfigCommon field and n-TimingAdvanceOffset field as ServingCellConfigCommon IE does. The ServingCellConfigCommonSIB does not include physCellId field because PCI of the cell is acquired by the UE during PBCH decoding.

The IE ServingCellConfig is used to configure (add or modify) the UE with a serving cell, which may be the SpCell or an SCell of an MCG or SCG. The parameters herein are mostly UE.

This IE contains following fields/IEs
CSI-ReportConfig IE (e.g. parameters for CSI report);
one or more BWP-Downlink IEs (e.g. parameters for downlink BWP); The IE BWP-Downlink is used to configure an additional downlink bandwidth part;
one or more BWP-Uplink IEs (e.g. parameters for uplink BWP); The IE BWP-Uplink is used to configure an additional uplink bandwidth part; The IE BWP-Uplink contains following IEs/fields:
one or more RACH-ConfigCommon (e.g. parameters for random access procedure common for one or more UEs);
PUCCH-Config IE (e.g. parameters for PUCCH);
SRS-Config IE (e.g. parameters for SRS);
BeamFailureRecoveryConfig RadioBearerConfig is used to add, modify and release signalling, multicast MRBs and/or data radio bearers.
RadioBearerConfig contains at least following IEs:
Zero or more SRB-ToAddMod (parameters for SRB configuration) IEs; Each of SRB-ToAddMod IE includes following fields/IEs for a SRB:
srb-Identity field; this field includes an information corresponding to a specific integer; the integer is the identifier of the SRB;
reestablishPDCP field; this field includes an enumerated value indicating 'true';
discardOnPDCP field: this field includes an enumerated value indicating 'trune';
pdcp-Config field: this field includes PDCP-Config IE (e.g., configurable PDCP parameters);
Zero or more DRB-ToAddMod (parameters for DRB configuration) IEs; Each of DRB-ToAddMod IE includes following fields/IEs for a DRB:
drb-Identity field; this field includes an information corresponding to a specific integer; the integer is the identifier of the DRB;
reestablishPDCP field; this field includes an enumerated value indicating 'true';
recoverPDCP field: this field includes an enumerated value indicating 'trune';
pdcp-Config field: this field includes PDCP-Config IE (e.g., configurable PDCP parameters);
reestablishPDCP field indicates that PDCP should be re-established. Network sets this to true whenever the security key used for this radio bearer changes. If this field is included for a DRB or for a SRB, UE performs PDCP entity re-establishment procedure. In PDCP entity re-establishment procedure, UE initializes PDCP variables and changes the security keys and performs retransmission or transmission of stored PDCP SDUs after header compression.

recoverPDCP field indicates that PDCP should perform recovery. If this field is included for a DRB, UE performs retransmission of all the PDCP Data PDUs previously submitted to re-established or released AM RLC entities in ascending order of the associated COUNT values for which the successful delivery has not been confirmed by lower layers.

discardOnPDCP field indicates that PDCP should discard stored SDU and PDU. If this field is included for for a SRB, UE discards all stored PDCP SDUs and PDCP PDUs of the SRB.

The IE CSI-ReportConfig is used to configure a periodic or semi-persistent report sent on PUCCH on the cell in which the CSI-ReportConfig is included, or to configure a semi-persistent or aperiodic report sent on PUSCH triggered by DCI received on the cell in which the CSI-ReportConfig is included.

This IE includes following fields/IEs:
carrier field indicates in which serving cell the CSI-ResourceConfig indicated below are to be found. If the field is absent, the resources are on the same serving cell as this report configuration.
reportConfigType field indicates time domain behavior of reporting configuration. This field includes following IEs
one or more PUCCH-CSI-Resource; each PUCCH-CSI-Resource IE indicates PUCCH resource to be used for CSI reporting;
reportQuantity field indicates the CSI related quantities to report.
reportSlotConfig indicates periodicity and slot offset
resourcesForChannelMeasurement field contains a CSI-ResourceConfigId. This field indicates resources for channel measurement. csi-ResourceConfigId of a CSI-ResourceConfig included in the configuration of the serving cell indicated with the field "carrier" above.

The IE RACH-ConfigCommon is used to specify the cell specific random-access parameters.

This IE contains followings:
parameters for PRACH occasions;
parameters for preambles;
parameters for random access response;
parameters for contention resolution;
parameters for power control (for preamble transmission power and Msg3 transmission power);

The IE RACH-ConfigDedicated is used to specify the dedicated random access parameters.
parameters for PRACH occasions for dedicate usage;
parameters for preamble for dedicate usage.

ReconfigurationWithSync IE contains various parameters related to synchronous reconfiguration. It includes:
cell specific serving cell configuration for the target SpCell;
common RACH configuration to be applied in the target SpCell;
dedicate RACH occasions and preamble to be applied to the random access procedure triggered for synchronous reconfiguration.

Figure 3C:
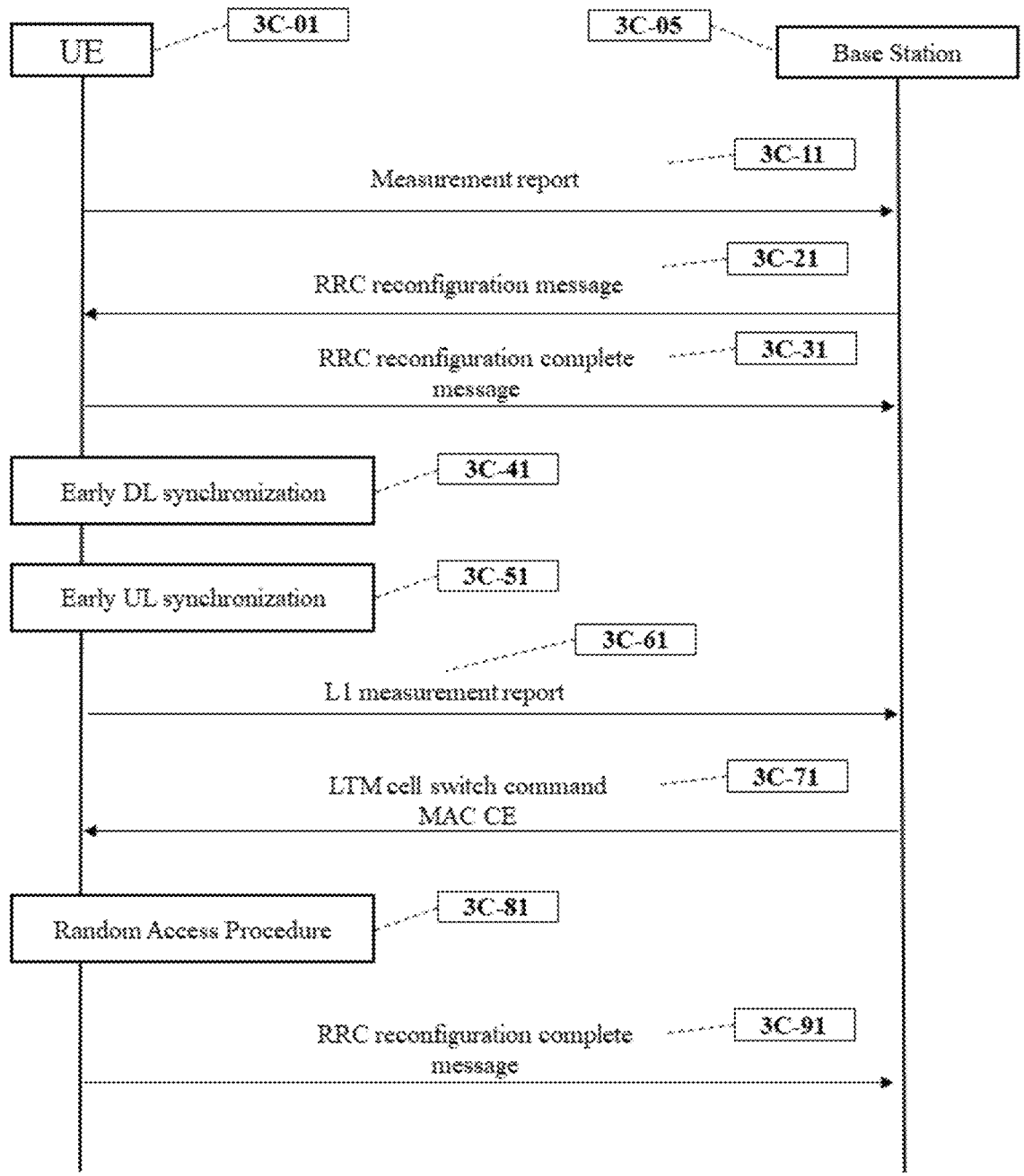
FIG. 3C is a diagram illustrating L1/L2 triggered mobility procedure.

FIG. 3C illustrates the overall procedure for LTM.

LTM is a procedure in which a GNB receives L1 measurement report(s) from a UE, and on their basis the GNB changes UE serving cell by a cell switch command signalled via a MAC CE. The cell switch command indicates an LTM candidate configuration that the GNB previously prepared and provided to the UE through RRC signalling. Then the UE switches to the target configuration according to the cell switch command.

When configured by the network, it is possible to activate TCI states of one or multiple cells that are different from the current serving cell. For instance, the TCI states of the LTM candidate cells can be activated in advance before any of those cells become the serving cell. This allows the UE to be DL synchronized with those cells, thereby facilitating a faster cell switch to one of those cells when cell switch is triggered.

When configured by the network, it is possible to initiate UL TA acquisition (called early TA) procedure of one or multiple cells that are different from the current serving cells. If the cell has the same NTA as the current serving cells or NTA=0, early TA acquisition procedure is not required.

The network may request the UE to perform early TA acquisition of a candidate cell before a cell switch. The early TA acquisition procedure is triggered by PDCCH order. The GNB/GNB-DU to which the candidate cell belongs calculates the TA value and sends it to the GNB/GNB-DU to which the serving cell belongs via GNB-CU. The serving cell sends the TA value in the LTM cell switch command MAC CE when triggering LTM cell switch.

Depending on the availability of a valid TA value, the UE performs either a RACH-less LTM or RACH-based LTM cell switch. If the valid TA value is provided in the cell switch command, the UE applies the TA value as instructed by the network. In the case where UE-based TA measurement is configured, but no valid TA value is provided in the cell switch command, the UE applies the valid TA value by itself if available. Meanwhile, the UE performs RACH-less LTM cell switch upon receiving the cell switch command. If no valid TA value is available, the UE performs RACH-based LTM cell switch.

Regardless of whether the UE is configured for UE-based TA measurement for a certain candidate cell, it will still follow the PDCCH order, which includes requesting a random access procedure towards the candidate cells. This also applies to the candidate cells for which the UE is capable of deriving TA values by itself. Additionally, regardless of whether the UE has already performed a random access procedure towards the candidate cells, it will still follow the UE-based measurement configuration if configured by the network.

For RACH-less LTM, the UE accesses the target cell using either a configured grant or a dynamic grant. The configured grant is provided in the LTM candidate configuration, and the UE selects the configured grant occasion associated with the beam indicated in the cell switch command. Upon initiation of LTM cell switch to the target cell, the UE starts to monitor PDCCH on the target cell for dynamic scheduling. Before RACH-less LTM procedure completion, the UE shall not trigger random access procedure if it does not have a valid PUCCH resource for triggered SRs.

The following principles apply to LTM:
Security keys are maintained upon an LTM cell switch;
Subsequent LTM is supported.

The overall procedure for LTM is as followings. Before LTM procedure is initiated, UE and GNB performs data transfer based on activated TCI states. GNB may use type 1 TCI state activation/deactivation MAC CE to activate TCI states when LTM procedure is not ongoing.

The UE sends a MeasurementReport message to the GNB. The GNB decides to configure LTM and initiates LTM preparation 3C-11.

The GNB transmits an RRCReconfiguration message to the UE including the LTM candidate configurations 3C-21.

The UE stores the LTM candidate configurations and transmits an RRCReconfigurationComplete message to the GNB 3C-31.

The UE performs early DL synchronization with the LTM candidate cell(s) before receiving the cell switch command 3C-41. The UE may activate and deactivate TCI states of LTM candidate cell(s), as triggered by the GNB. For this operation, type 2 type 2 TCI state activation/deactivation MAC CE is used. Apart from the early DL synchronization with the LTM candidate cell, GNB may use type 1 TCI state activation/deactivation MAC CE to active TCI states of serving cells.

The UE may perform early UL synchronization with LTM candidate cell(s) 3C-51 before receiving the cell switch command, by using UE-based TA measurement, if configured, and/or by transmitting a preamble towards the candidate cell, as triggered by the GNB. UE performs early TA acquisition with the candidate cell(s) as requested by the network before receiving the cell switch command.

The UE performs L1 measurements on the configured LTM candidate cell(s) and transmits L1 measurement reports to the GNB 3C-61.

The GNB decides to execute cell switch to a target cell and transmits an LTM cell switch command MAC CE 3C-71 triggering cell switch by including a target configuration ID which indicates the index of the candidate configuration of the target cell, a beam indicated with a TCI state or beams indicated with DL and UL TCI states, and a timing advance command for the target cell. The UE switches to the target cell and applies the candidate configuration indicated by the target configuration ID.

The UE performs the random access procedure towards the target cell 3C-81, if UE does not have valid TA of the target cell.

The UE completes the LTM cell switch procedure by sending RRCReconfigurationComplete message to target cell 3C-91.

RRC reconfiguration procedure is used for mobility purpose, the procedure should be synchronous between the UE and the base station. In that sense, RRC reconfiguration for mobility purpose could be denoted as synchronous reconfiguration. When the reconfiguration for mobility is triggered by a layer 3 control message (e.g., RRC message), the reconfiguration is denoted as layer 3 triggered synchronous reconfiguration (L3SR) or as layer 3 triggered reconfiguration for mobility (e.g., L3RM). When the reconfiguration for mobility is triggered by a layer 2 control message (e.g., MAC CE), the reconfiguration is denoted as layer 2 triggered synchronous reconfiguration (L2SR) or as layer 2 triggered reconfiguration for mobility (e.g., L2RM).

Figure 4A:
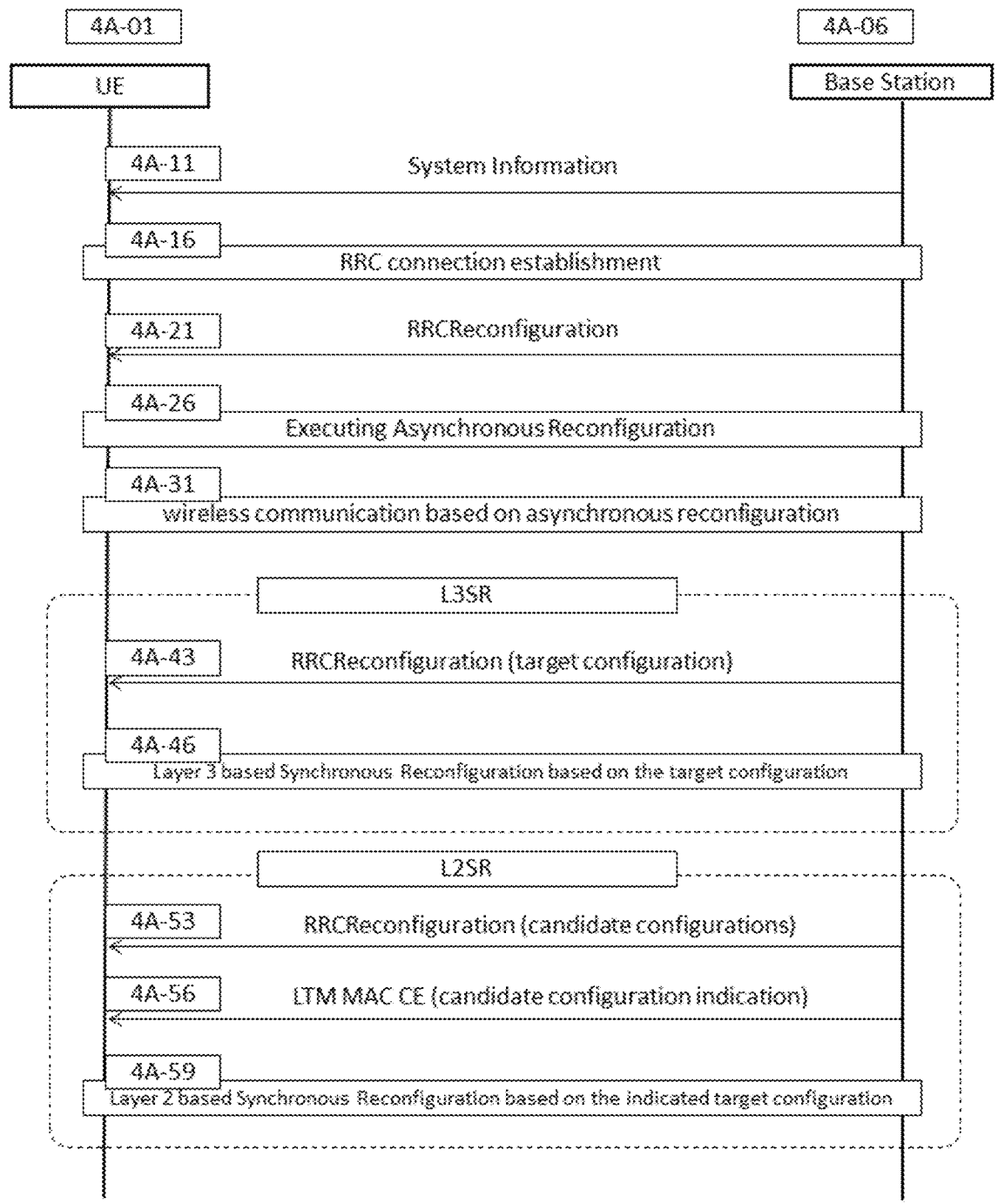
FIG. 4A illustrates the operation of a UE and a base station for synchronous reconfiguration.

FIG. 4A illustrates the operation of a UE and a base station.

The UE 4A-01 is camping on a cell which is controlled by a base station 4A-06.

At 4A-11, UE receives system information from the base station. The system information includes ServingCellConfigCommonSIB to be applied by the UE in the cell.

At 4A-16, UE performs RRC connection establishment procedure with a base station based on the parameters contained in the ServingCellConfigCommonSIB. UE and the base station establish SRB1 during the RRC connection establishment procedure. The cell becomes SpCell of the UE after RRC connection establishment procedure.

In the RRC connection establishment procedure, UE receives from the base station a RRCSetup. The RRCSetup includes ServingCellConfig to be applied by the UE in the CELL1. The RRRCSetup includes RadioBearerConfig for SRB1.

After SRB1 establishment, UE may report its capability to the base station. The base station may decide the configuration to be applied to the UE based on the UE capability and traffic load status and traffic requirement. UE may report in which frequency bands the UE supports L3SR. UE may report in which frequency bands UE supports L2SR.

RRC connection establishment procedure is performed along with random access procedure.

At 4A-21, The base station transmits a first RRCReconfiguration to the UE. The first RRCReconfiguration may include at least following IEs/fields:

ServingCellConfig (or one or more fields contained in the IE); this IE, if included, replaces ServingCellConfig (or one or more field contained in the IE) received in RRCSetup;

RadioBearerConfig; the UE and base station establishes SRB2 and SRB4 based on this IE; the UE and the base station establishes one or more DRBs based on this IE.

At 4A-26, UE and the base station perform/execute asynchronous reconfiguration procedure based on the configuration information included in the first RRCReconfiguration.

UE and base station determine to perform asynchronous reconfiguration procedure if the corresponding RRCReconfiguration does not include ReconfugrationWithSync IE.

UE applies the configuration information in the first RRCReconfiguration at time_point_1 and the base station applies the configuration information at time_point_2. The time_point_1 is when UE decodes the configuration information. The time_point_2 is when the base station consider transmission of the RRCReconfiguration containing the configuration information is successful (e.g. when HARQ ACK for the RRCReconfiguration is received).

After completion of the asynchronous reconfiguration procedure, UE and the base station perform wireless communication based on the following configuration 4A-31:

ServingCellConfigCommonSIB (e.g. broadcasted common serving cell configuration) received in the SIB1 of the SpCell (if ServingCellConfigCommon is not provided in RRCSetup) or ServingCellConfigCommon (e.g. dedicatedly delivered common serving cell configuration) in RRCSetup (if ServingCellConfigCommon is provided in RRCSetup);

ServingCellConfig (e.g. dedicate serving cell configuration) received in the RRCSetup (if the first RRCReconfgiration does not include ServingCellConfig) or in the first RRCReconfiguration (if the first RRCReconfiguration includes ServingCellConfig);

RadioBearConfig (e.g. radio bearer configuration) received in the first RRCReconfiguration (for SRB2 and SRB4) or RadioBearerConfig receive in the RRCSetup (SRB1);

UE performs following operation based on ServingCellConfigCommonSIB received in the SIB1 of the SpCell:
initial BWP determination based on downlinkConfigCommon and uplinkConfigCommon;
contention based random access procedure in the initial BWP based on RACH-ConfigCommon (e.g. common RACH configuration);
uplink timing alignment based on n-TimingAdvanceOffset;

UE performs following operations based on ServingCellConfig received in the RRCSetup or in the first RRCReconfiguration:
BWP switching based on one or more BWP configuration information;
CSI reporting based on CSI-ReportConfig;
Scheduling Request based on SchedulingRequestReourceConfig;
SRS transmission based on SRS-Config;
TimeAlignmentTImer maintenance (e.g. setting the value of the timer) based on timeAlignmentTimer field for TAG 0

UE performs following operations based on RadioBearConfig received in the first RRCReconfiguration:
RRC message transmission and reception via SRB1 based on SRBToAddMod in RRCSetup;

RRC message transmission and reception via SRB2 and or SRB4 based on SRBToAddMod IEs in the first RRCReconfiguration;

IP packet transmission and reception via DRBs based on DRBToAddMod IEs in the first RRCReconfiguration.

To support UE mobility, the base station may determine to perform either L2SR or L3SR.

If the base station determines to apply L3SR, the base station and the UE perform 4A-43 and 4A-46.

If the base station determines to apply L2SR, the base station and the UE perform 4A-53 and 4A-56 and 4A-59.

For L3SR, the base station transmits to the UE a second RRCReconfiguration 4A-43.

The second RRCReconfiguration comprises ReconfigurationWithSync IE that contains common serving cell configuration for the target SpCell. The second RRCReconfiguration comprises various configurations such as RadioBeearConfig if the configurations are required to be updated.

The UE and the base station perform L3SR based on the target configuration contained in the second RRCReconfiguration 4A-46.

When the L3SR is triggered: UE performs configurations based on the target configurations contained in the second RRCReconfiguration; UE sets the contents of RRCReconfigurationComplete based on the contents of the second RRCReconfiguration; and UE transmits the RRCReconfigurationComplete in the target cell.

The configuration information such as ReconfigurationWithSync comprises various information for the target SpCell. The UE performs downlink synchronization for the target SpCell.

To transmit the RRCReconfigurationComplete, the UE initiates random access procedure in the target SpCell.

When the random access procedure triggered for RRCReconfigurationComplete is successfully completed, the UE and the base station consider the L3SR is successfully completed.

For L2SR, the base station transmits to the UE a third RRCReconfiguration 4A-53.

The third RRCReconfiguration comprises LTM-Config IE that contains a reference configuration and one or more candidate configurations.

The reference configuration comprises an embedded RRCReconfiguration.

Each candidate configuration comprises an embedded RRCReconfiguration. Each candidate configuration is associated with an identifier (e.g. candidateId).

The embedded RRCReconfiguration of each candidate configuration contains delta configuration over the embedded RRCReconfiguration of the reference configuration.

The UE generates a complete/target/final candidate configuration for a candidate by combining the embedded RRCReconfiugration of the candidate configuration with the embedded RRCReconfiguration of the reference configuration. More specifically, the UE determines:

IE X (of field x) of the candidate configuration is the IE X of the final candidate configuration:
  if the IE X is present both in the candidate configuration and the reference configuration; or
  if the IE X is present only in the candidate configuration;

IE Y (or field y) of the reference configuration as the IE Y of the final candidate configuration:
  if the IE Y is present only in the reference configuration.

Based on the layer 1 measurements (e.g. CSI measurement and CSI report), the base station may determine that cell switch is required for the UE.

The base station transmits UE LTM MAC CE 4A-56.

The UE and the base station perform L2SR based on the final candidate configuration indicated in the LTM MAC CE 4A-59.

When the L2SR is triggered: UE performs configurations based on the stored final configuration indicated by the MAC CE; UE sets the contents of RRCReconfigurationComplete based on the contents of the embedded RRCReconfiguration of the candidate configuration indicated by the MAC CE; and UE transmits the RRCReconfigurationComplete in the target SpCell of the candidate configuration.

The configuration information such as switch_info comprises various information for the target SpCell. The UE performs downlink synchronization for the target SpCell.

To transmit the RRCReconfigurationComplete, the UE may either initiate random access procedure in the target SpCell or monitor PDCCH to acquire uplink grant or use configured grant (if configured).

The UE and the base station consider the L2SR is successfully completed, when:
  the random access procedure triggered for RRCReconfigurationComplete is successfully completed; or
  uplink grant for new transmission is received after transmission of the RRCReconfigurationComplete.

FIG. 4B illustrates format of the MAC CE.

Target Configuration ID: This field indicates the index of candidate target configuration to apply for LTM cell switch, corresponding to ltm-CandidateId.

Timing Advance Command: This field indicates whether the TA is valid for the LTM target cell (i.e. the SpCell corresponding to the target configuration indicated by Target Configuration ID field). If the value of this field is set to FFF, this field indicates that no valid timing adjustment is available for the PTAG of the LTM target cell (and UE shall perform Random Access to the LTM target cell); Otherwise, this field indicates the index value TA used to control the amount of timing adjustment that the MAC entity has to apply, and that the UE can skip the Random Access procedure for this LTM cell switch.

TCI state ID: This field indicates and activates the TCI state for the LTM target cell (i.e. the SpCell of the target configuration indicated by the Target Configuration ID field). The TCI state is identified by TCI-StateId. If the value of unifiedTCI-StateType in the SpCell of the target configuration indicated by Target Configuration ID field is joint, this field is for joint TCI state, otherwise, this field is for downlink TCI state. This field is included when the value of the Timing Advance Command field is not set to FFF.

UL TCI state ID: This field indicates and activates the uplink TCI state for the LTM target cell (i.e. the SpCell of the target configuration indicated by the Target Configuration ID field). The most significant bits of UL TCI state ID are considered as reserved bits and the remainder 6 bits indicate the TCI-UL-StateId. This field is included if the value of unifiedTCI-StateType in the SpCell corresponding to the target configuration indicated by Target Configuration ID field is separate and if the value of the Timing Advance Command field is not set to FFF.

PDCP discard operation is required upon mobility to prevent message generated in the source cell to be transmitted in the target cell, which may cause harm in network by triggering unnecessary procedures. Especially for SRB, PDCP discard is highly likely to be required upon cell level mobility. For L3RM, terminal performs PDCP discard operation based on a specific indication per bearer indicated in the RRC message that triggers the L3RM. This approach is not suitable for L2RM due to that reconfiguration is triggered by MAC CE that may not be suitable to carry the per-bearer indication and that expected behaviour is rather stable in L2RM. Instead of explicit per bearer indication, UE performs PDCP discard operation upon L2RM based on type of bearers.

For PDCP buffer management upon synchronous reconfiguration, UE may:
  receive a RRCSetup;
    configure a first radio bearer;
  receive a first RRCReconfiguration;
    configure a second radio bearer;
  receive a second RRCReconfiguration:
    the second RRCReconfiguration comprises:
      an embedded RRCReconfiguration for reference configuration; and
      one or more embedded RRCReconfiguration for candidate configuration;
    each of the embedded RRCReconfiguration for candidate configuration (and final configuration) is associated with a candidate identifier;
  generate a final/complete configuration, for each candidate configuration, based on the corresponding candidate configuration and the reference configuration;
  receive a LTM MAC CE instructing UE to perform reconfiguration for mobility based on a first candidate configuration;
    the LTM MAC CE comprises candidate identifier corresponding to the first candidate configuration;
  perform operations for layer 2:
    for a first radio bearer (e.g. SRB1), perform PDCP discard operation in case that;
      the LTM MAC CE is received;
    for a first radio bearer (e.g. SRB1), perform RLC discard operation in case that;
      the LTM MAC CE is received;
    for a second radio bearer (e.g. DRB x), perform PDCP retransmission operation in case that:
      the LTM MAC CE is received; and
      the indicator relating to layer2 reset (e.g. ltm-ServingCellNoResetID) of the first candidate configuration is different from the indicator relating to layer2 reset of the current (candidate) configuration; and
      the second radio bearer is part of the current configuration; and
      the drb-Identity of the second radio bearer is included in the drb-ToAddModList of the first candidate configuration (or embedded RRCReconfiguration of the first candidate configuration); or the second radio bearer is part of the final/complete configuration of the first candidate configuration;
    for a second radio bearer, perform RLC discard operation in case that:
      LTM MAC CE instructing reconfiguration for mobility is received; and
      the indicator relating to layer2 reset (e.g. ltm-ServingCellNoResetID) of the first candidate configuration is different from the indicator relating to layer2 reset of the current (candidate) configuration; and
      the second radio bearer is part of the current UE configuration; and
      the RLC-BearerConfig of the second radio bearer is included in the rlc-BearerToAddModList of the first candidate configuration; or the RLC bearer of the second radio bearer is part of the final/complete configuration of the first candidate configuration;
  perform transmission and reception with the base station based on the final/complete configuration of the first candidate configuration after completion of L2RM;
  receive a second RRCReconfiguration instructing UE to perform reconfiguration for mobility based on a target configuration;
    the target configuration is comprised in the second RRCReconfiguration;
  perform operations for layer 2:
    for a first radio bearer (e.g. SRB1), perform PDCP discard operation in case that;
      the second RRCReconfiguration is received; and
      an indicator to perform PDCP discard operation (e.g. discardOnPDCP) is comprised in the SRB-ToAddMod corresponding to the first radio bearer in the second RRCReconfiguration
    for a first radio bearer (e.g. SRB1), perform RLC discard operation in case that;
      the second RRCReconfiguration is received; and
      an indicator to perform RLC reestablishment (e.g. reestablishRLC) is comprised in the RLC bearer configuration corresponding to the first radio bearer in the second RRCReconfiguration
    for a second radio bearer (e.g. DRB x), perform PDCP retransmission operation in case that:
      the second RRCReconfiguration is received; and
      an indicator to perform PDCP retransmission operation (e.g. recoverPDCP) is comprised in the DRB-ToAddMod corresponding to the second radio bearer in the second RRCReconfiguration
    for a second radio bearer (e.g. DRB x), perform RLC discard operation in case that;
      the second RRCReconfiguration is received; and
      an indicator to perform RLC reestablishment (e.g. reestablishRLC) is comprised in the RLC bearer configuration corresponding to the second radio bearer in the second RRCReconfiguration
  The first radio bearer is:
  configured during RRC connection establishment procedure;
    configuration information is comprised in the RRCSetup;
  used to transfer RRC messages;
  maintained, once established, until RRC connection is released;
  RLC AM bearer.
  The second radio bearer is:
  configured during RRC connection reconfiguration procedure;
    configuration information is comprised in the RRCReconfiguration;
  used to transfer IP packets (of specific set of IP/QoS flows);
  modified or released based on the new configuration during RRC_CONNECTED state either RLC AM bearer or RLC UM bearer depending on QoS requirement of traffic (e.g. QoS flows) that are served by the first bearer.

For PDCP discard procedure of a radio bearer, UE may:
discard all PDCP SDUs awaiting transmission in the PDCP transmission buffer; and
discard all PDCP PDUs awaiting retransmission in the PDCP transmission buffer; and
discard all PDCP PDUs for deciphering in the PDCP reception buffer; and
discard all PDCP PDUs for header decompression (and for reordering) in the PDCP reception buffer.

For PDCP retransmission procedure of a radio bearer, UE may:
perform retransmission of all the PDCP PDUs previously submitted to re-established or released AM RLC entities in ascending order of the associated COUNT values for which the successful delivery has not been confirmed by lower layers.

For RLC discard procedure for a RLC bearer, UE may:
discard all RLC SDUs in the RLC transmission buffer; and
discard all RLC SDU segments and RLC PDUs in the RLC retransmission buffer; and
discard all RLC segments in the RLC reception buffer (or RLC reassembly buffer).

RLC bearers that are part of the current UE configuration are:
RLC bearers configured by one or more RLC-BearerConfigs within rlc-BearerToAddModList of the RRCSetup and not released by rlc-BearerToReleaseList; and
RLC bearers configured by one or more RLC-BearerConfigs within rlc-BearerToAddModList of the first RRCReconfiguration not released by rlc-BearerToReleaseList;

RLC bearers that are part of the final/complete configuration of the first candidate configuration are:
RLC bearers to be configured by one or more RLC-BearerConfigs within rlc-BearerToAddModList of a complete/final RRCReconfiguration;

RLC bearers that are part of the target configuration are:
RLC bearers to be configured by one or more RLC-BearerConfigs within rlc-BearerToAddModList of a third RRCReconfiguration (RRCReconfiguration comprising ReconfigurationWithSync);

DRBs that are part of the current UE configuration are:
DRBs configured by one or more DRB-ToAddMods within DRB-ToAddModList of the first RRCReconfiguration and not released by DRB-ToReleaseList in other RRCReconfiguration;

DRBs that are part of the final/complete configuration of the first candidate configuration are:
DRBs to be configured by one or more DRB-ToAddMods within DRB-ToAddModList of the complete/final RRCReconfiguration (e.g. complete/final configuration);

DRBs that are part of the target configuration are:
DRBs to be configured by one or more DRB-ToAddMods within DRB-ToAddModList of the third RRCReconfiguration (RRCReconfiguration comprising ReconfigurationWithSync);

SRBs that are part of the current UE configuration are:
SRBs configured by one or more SRB-ToAddMods within SRB-ToAddModList of the first RRCReconfiguration;

SRBs that are part of the final/complete configuration of the first candidate configuration are:
SRBs to be configured by one or more SRB-ToAddMods within SRB-ToAddModList of the complete/final RRCReconfiguration;

SRBs that are part of the target configuration are:
SRBs to be configured by one or more SDRB-ToAddMods within SRB-ToAddModList of the third RRCReconfiguration (RRCReconfiguration comprising ReconfigurationWithSync) The complete/final RRCReconfiguration (e.g. complete final configuration) is generated, with giving higher priority to the candidate embedded RRCReconfuration, from:
the reference embedded RRCReconfiguration; and
the candidate embedded RRCReconfiguration corresponding to the first candidate configuration;

Having a reference configuration that are applied to more than one candidate configuration would provide signaling overhead reduction. Considering that significant number of candidate configurations could be signaled, signaling overhead reduction is an important benefit. One problem of reference configuration is that there is no clear way to release certain type of configurations (that rely on release-list) because having release-list in the reference configuration does not much sense.

In this disclosure, to make reference configuration really work, an approach is introduced to release configuration based on comparison between target configuration and current configuration.

Figure 5A:
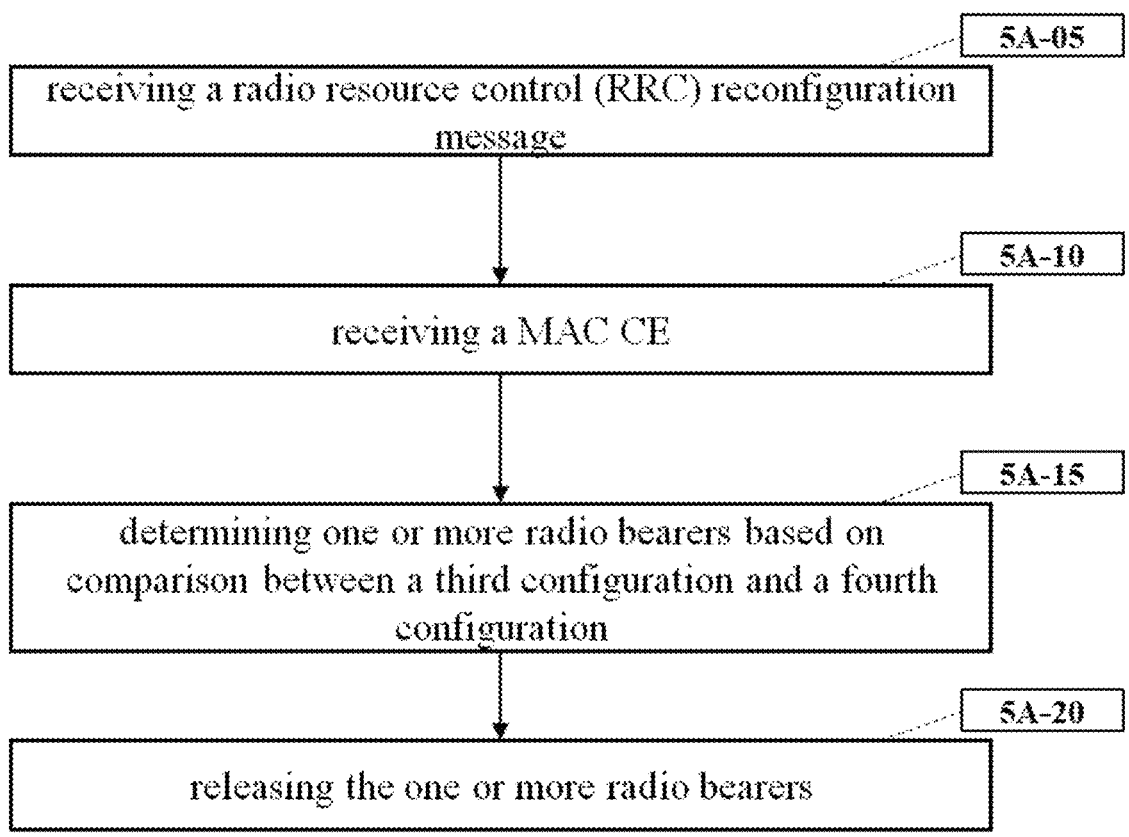
FIG. 5A is a flow diagram illustrating an operation of a terminal.

To release configurations upon reconfiguration for mobility, UE may:
receive a RRCSetup;
configure a SRB1 based on a SRB-ToAddMod of which SRB-Identity is 1;
receive a first RRCReconfiguration;
configure a SRB4 based on a SRB-ToAddMod in which SRB-Identity-2 is included;
configure one or more DRBs based on DRBToAddModList IE;
configure measObjects (reportConfig/measId) based on MeasObjectToAddModList (ReportConfigToAddModList/MeasIdToAddModList);
receive a second RRCReconfiguration:
the RRCReconfiguration comprises:
an embedded RRCReconfiguration for reference configuration; and
one or more embedded RRCReconfiguration for candidate configuration;
each of the embedded RRCReconfiguration for candidate configuration (and final configuration) is associated with a candidate identifier;
generate a final/complete configuration, for each candidate configuration, based on the corresponding candidate configuration and the reference configuration;
receive a LTM MAC CE instructing reconfiguration for mobility based on a first candidate configuration;
determine RLC bearers to be released during the reconfiguration for mobility; UE may determine following RLC bearers to be released:
RLC bearer that is part of the current UE configuration but not part of the final/complete configuration of the first candidate configuration:
UE determines whether a RLC bearer is part of the current configuration and not part of the final/complete configuration based on either LogicalChannelIdentity IE or servedRadioBearer field:

if a LogicalChannelIdentity in the current configuration is not indicated in the rlc-BearerToAddModList of the final configuration, UE determines the RLC bearer corresponding to the LogicalChannelIdentity is part of the current configuration but not part of the final configuration; or if a radio bearer corresponding to a SRB-Identity or a DRB-Identity in a servedRadioBearer field of the current configuration is released by applying the final/complete configuration, the UE determines the RLC bearer is to be released;

determine DRBs to be released during the reconfiguration for mobility; UE may determine following DRBs to be released:
DRBs that is part of the current UE configuration but not part of the final/complete configuration of the first candidate configuration:

UE determines whether a DRB is part of the current configuration and not part of the final/complete configuration based on DRB-Identity IE:
if a DRB-Identity in the current configuration is not indicated in the DRB-ToAddModList of the final/complete configuration, UE determines the corresponding DRB is part of the current configuration but not part of the final configuration;

determine SRBs to be released during the reconfiguration for mobility; UE may determine following SRBs to be released:
SRBs that is part of the current UE configuration but not part of the final/complete configuration of the first candidate configuration;

UE determines whether a SRB is part of the current configuration and not part of the final/complete configuration based on SRB-Identity IE:
if a SRB-Identity in the current configuration is not indicated in the SRB-ToAddModList of the final/complete configuration, UE determines the corresponding DRB is part of the current configuration but not part of the final configuration;

determines to release all measIds and all measObjects and all ReportConfigs of the current configuration;

release the RLC bearers and the DRBs and SRBs and measIds and measObjects and ReportConfigs during a first period;
the first period is:
after synchronizing to the downlink of the SpCell of the final/complete configuration; and
before transmission of RRCReconfigurationComplete;

determine RLC bearers to be added during the reconfiguration for mobility; UE may determine following RLC bearers to be added:
RLC bearer that is not part of the current UE configuration but part of the final/complete configuration of the first candidate configuration:

determine DRBs to be added during the reconfiguration for mobility; UE may determine following DRBs to be added:
DRBs that is not part of the current UE configuration but part of the final/complete configuration of the first candidate configuration:

determine SRBs to be added during the reconfiguration for mobility; UE may determine following SRBs to be released:
SRBs that is not part of the current UE configuration but part of the final/complete configuration of the first candidate configuration:

determine followings of final/complete configuration of the first candidate configuration to be added:
all MeasIds in MeadIdAddModList; and
all MeasObjects in MeasObjectToAddModList; and
all ReportConfigs in ReportConfigToAddModList;

add SRBs and DRBs and measurement configurations;
perform transmission/reception with the base station in the new cell based on the added SRBs and DRBs and measurement configurations;
receive a second RRCReconfiguration comprising ReconfigurationWithSync;
determine RLC bearers to be released during the reconfiguration for mobility; UE may determine following RLC bearers to be released:
RLC bearer of which LogicalChannelIdentity is indicated in rlc-BearerToReleaseList in the second RRCReconfiguration:

determine DRBs to be released during the reconfiguration for mobility; UE may determine following DRBs to be released:
DRB of which DRB-Identity is indicated in DRB-ToReleaseList in the second RRCReconfiguration;

determine SRBs to be released during the reconfiguration for mobility; UE may determine following SRBs to be released:
SRB for which release indicator (e.g. srb4-ToRelease) is comprised in the RadioBearerConfig of the second RRCReconfiguration;

determine to release:
measIds in MeasIdToRemoveList of the second RRCReconfiguration; and
MeasObjects in MeasObjectToRemoveList of the second RRCReconfiguration; and
ReportConfigs in ReportConfigToRemoveList of the second RRCReconfiguration;

release the RLC bearers and the DRBs and SRBs and measIds and measObjects and ReportConfigs during a second period;
the second period is:
after synchronizing to the downlink of the SpCell of the final/complete configuration; and
before transmission of random access preamble in the target SpCell;

determine RLC bearers to be added during the reconfiguration for mobility; UE may determine following RLC bearers to be added:
RLC bearer that is not part of the current UE configuration but part of the target configuration (indicated in the second RRCReconfiguration);

determine DRBs to be added during the reconfiguration for mobility; UE may determine following DRBs to be added:
DRBs that is not part of the current UE configuration but part of the target configuration (indicated in the second RRCReconfiguration):

determine SRBs to be added during the reconfiguration for mobility; UE may determine following SRBs to be added:
SRBs that is not part of the current UE configuration but part of the target configuration (indicated in the second RRCReconfiguration);

add SRBs and DRBs and measurement configurations;
perform transmission/reception with the base station in the new cell based on the added SRBs and DRBs and measurement configurations; For buffer handling and timer handling during reconfiguration for mobility, UE may:

receive a RRCSetup;
   configure MAC entity;
   configure a SRB1;
receive a first RRCReconfiguration;
   configure a SRB4;
   configure one or more DRBs;
receive a second RRCReconfiguration:
   the RRCReconfiguration comprises:
      an embedded RRCReconfiguration for reference configuration; and
      one or more embedded RRCReconfiguration for candidate configuration;
      each of the embedded RRCReconfiguration for candidate configuration (and final configuration) is associated with a candidate identifier;
generate a final/complete configuration, for each candidate configuration, based on the corresponding candidate configuration and the reference configuration;
receive a LTM MAC CE instructing reconfiguration for mobility based on a first candidate configuration;
perform HARQ buffer management;
   flush all HARQ transmission buffers;
perform RLM management;
   stop timer T310 for this cell group, if running;
   stop timer T312 for this cell group, if running;
   reset the counters N310 and N311;
start T304 as indicated in final/complete configuration of the first candidate configuration;
perform RLC buffer management based on final/complete configuration of the first candidate configuration;
   perform RLC discard operation for specific RLC bearers determined based on non-explicit information;
perform PDCP buffer management based on final/complete configuration of the first candidate configuration;
   perform PDCP discard operation for SRBs;
   perform PDCP retransmission operation for specific DRBs determined based on non-explicit information;
transmit RRCReconfigurationComplete based on final/complete configuration of the first candidate configuration;
perform transmission/reception with the base station in the new cell based on final/complete configuration of the first candidate configuration;
receive a second RRCReconfiguration comprising ReconfigurationWithSync;
start T304 as indicated in second RRCReconfiguration;
perform HARQ buffer management;
   flush all HARQ transmission buffers;
perform RLM management;
   stop timer T310 for this cell group, if running;
   stop timer T312 for this cell group, if running;
   reset the counters N310 and N311;
perform RLC buffer management based on second RRCReconfiguration;
   perform RLC discard operation for RLC bearers in an explicit list for RLC bearers;
perform PDCP buffer management based on second RRCReconfiguration;
   perform PDCP discard operation for radio bearers with an explicit indication;
transmit RRCReconfigurationComplete based on second RRCReconfiguration;
perform transmission/reception with the base station in the new cell based on second RRCReconfiguration;
FIG. 5A is a flow diagram illustrating an operation of a terminal.

UE may perform followings in order:
   receiving a radio resource control (RRC) reconfiguration message 5A-05;
   receiving a medium access control (MAC) control element (CE), wherein the MAC CE comprises the identifier associated with a specific second configuration 5A-10;
   determining one or more radio bearers based on comparison between a third configuration and a fourth configuration 5A-15; and
   releasing the one or more radio bearers 5A-20.

The RRC reconfiguration message comprises;
a first configuration [reference configuration]; and
one or more second configurations [candidate configuration], wherein each of the one or more second configurations is associated with an identifier.

The third configuration is determined based on the first configuration and the specific second configuration.

The one or more radio bearers are determined based on a specific part of the third configuration and the specific part of the fourth configuration. The specific part is radio bearer identifier.

UE further performs:
   determining one or more radio link control (RLC) bearers based on comparison between a second specific part of the third configuration and the second specific part of the fourth configuration, wherein the second specific part is logical channel identifier; and
   releasing the one or more RLC bearers.

The specific second configuration comprises delta configuration over the first configuration.

UE further performs transmitting a RRC reconfiguration complete message in response to the MAC CE.

Synchronous reconfiguration procedure caused by the MAC CE is completed in case that uplink grant for new transmission is received after transmission of the RRC reconfiguration complete message.

The terminal performs retransmission of a specific set of packet data convergence protocol (PDCP) protocol data units (PDUs) of a specific radio bearer in case that:
   no reset identifier of the fourth configuration is not equal to no reset identifier of the specific second configuration; and
   the radio bearer identifier of the specific radio bearer is part of the fourth configuration.

The specific radio bearer is:
radio bearer to transfer internet protocol (IP) packet; and
operating on radio link control (RLC) acknowledged mode (AM).

The specific set of PDCP PDUs comprises PDCP PDU:
   that is previously submitted to re-established or released AM RLC entities; and
   for which successful delivery has not been confirmed.

The terminal performs discarding of a second specific set of packet data convergence protocol (PDCP) packets of a second specific radio bearer in case that the MAC CE is received.

The second specific set of PDCP packets comprises:
PDCP Service Data Unit in buffer of transmitting PDCP entity;
PDCP PDU in buffer of transmitting PDCP entity; and
PDCP PDU in buffer of receiving PDCP entity.

The second specific radio bearer is signalling radio bearer 1.

The fourth configuration is configuration at a specific time. The specific time is after a specific RRC message is received and before the MAC CE is received. The specific RRC message is RRC message comprising configuration information of the one or more radio bearers.

A radio bearer is released in case that:
the radio bearer is part of the fourth configuration; and
the radio bearer is not part of the third configuration.

Figure 5B:
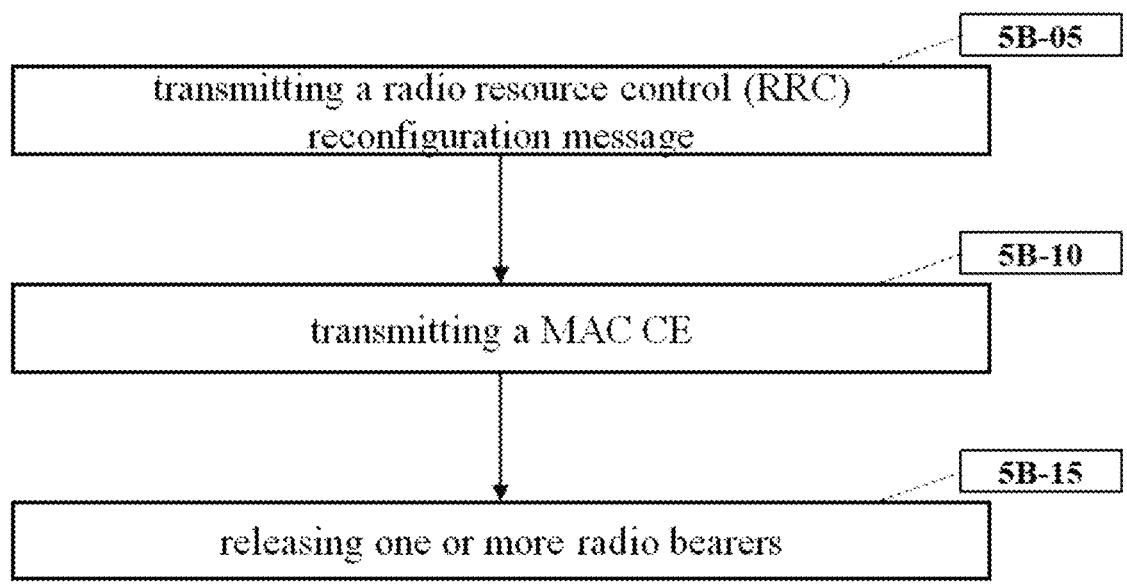
FIG. 5B is a flow diagram illustrating an operation of a base station.

FIG. 5B is a flow diagram illustrating an operation of a terminal.

The base station performs followings in order:
transmitting by the base station a radio resource control (RRC) reconfiguration message 5B-05, wherein the RRC reconfiguration message comprises;
a first configuration; and
one or more second configurations, wherein each of the one or more second configurations is associated with an identifier;
transmitting by the base station a medium access control (MAC) control element (CE) 5B-10, wherein the MAC CE comprises the identifier associated with a specific second configuration; and
releasing by the base station one or more radio bearers 5B-15,
wherein:
the one or more radio bearers are determined based on comparison between a third configuration and a fourth configuration; and
the third configuration is determined based on the first configuration and the specific second configuration.

Figure 6A:
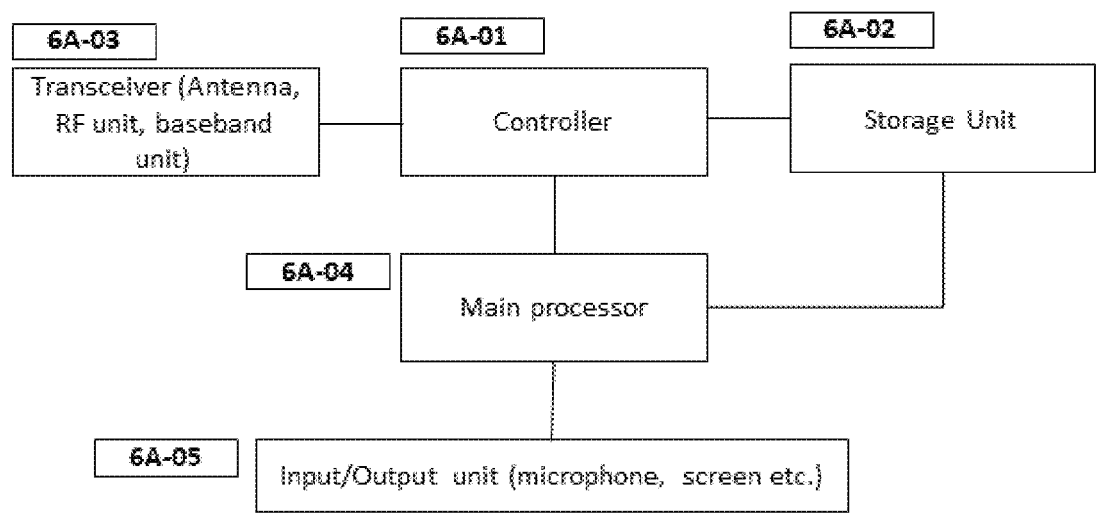
FIG. 6A is a block diagram illustrating the internal structure of a UE to which the disclosure is applied.

FIG. 6A is a block diagram illustrating the internal structure of a UE to which the disclosure is applied.

Referring to the diagram, the UE includes a controller 6A-01, a storage unit 6A-02, a transceiver 6A-03, a main processor 6A-04 and I/O unit 6A-05.

The controller 6A-01 controls the overall operations of the UE in terms of mobile communication. For example, the controller 6A-01 receives/transmits signals through the transceiver 6A-03. In addition, the controller 6A-01 records and reads data in the storage unit 6A-02. To this end, the controller 6A-01 includes at least one processor. For example, the controller 6A-01 may include a communication processor (CP) that performs control for communication and an application processor (AP) that controls the upper layer, such as an application program. The controller controls storage unit and transceiver such that UE operations in the present disclosure are performed.

The storage unit 6A-02 stores data for operation of the UE, such as a basic program, an application program, and configuration information. The storage unit 6A-02 provides stored data at a request of the controller 6A-01.

The transceiver 6A-03 consists of a RF processor, a baseband processor and one or more antennas. The RF processor performs functions for transmitting/receiving signals through a wireless channel, such as signal band conversion, amplification, and the like. Specifically, the RF processor up—converts a baseband signal provided from the baseband processor into an RF band signal, transmits the same through an antenna, and down—converts an RF band signal received through the antenna into a baseband signal. The RF processor may include a transmission filter, a reception filter, an amplifier, a mixer, an oscillator, a digital—to —analog converter (DAC), an analog—to —digital converter (ADC), and the like. The RF processor may perform MIMO and may receive multiple layers when performing the MIMO operation. The baseband processor performs a function of conversion between a baseband signal and a bit string according to the physical layer specification of the system. For example, during data transmission, the baseband processor encodes and modulates a transmission bit string, thereby generating complex symbols. In addition, during data reception, the baseband processor demodulates and decodes a baseband signal provided from the RF processor, thereby restoring a reception bit string.

The main processor 6A-04 controls the overall operations other than mobile operation. The main processor 6A-04 process user input received from I/O unit 6A-05, stores data in the storage unit 6A-02, controls the controller 6A-01 for required mobile communication operations and forward user data to I/O unit 6A-05.

I/O unit 6A-05 consists of equipment for inputting user data and for outputting user data such as a microphone and a screen. I/O unit 6A-05 performs inputting and outputting user data based on the main processor's instruction.

Figure 6B:
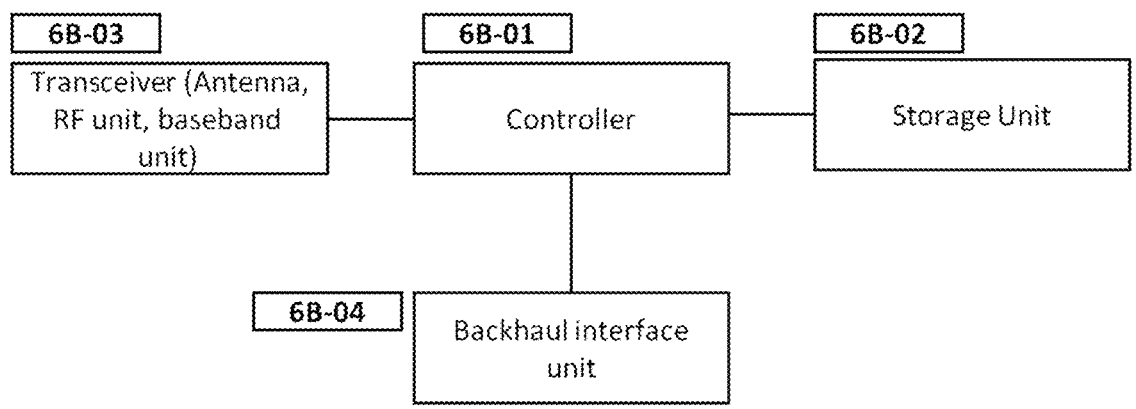
FIG. 6B is a block diagram illustrating the configuration of a base station according to the disclosure.

FIG. 6B is a block diagram illustrating the configuration of a base station according to the disclosure.

As illustrated in the diagram, the base station includes a controller 6B-01, a storage unit 6B-02, a transceiver 6B-03 and a backhaul interface unit 6B-04.

The controller 6B-01 controls the overall operations of the main base station. For example, the controller 6B-01 receives/transmits signals through the transceiver 6B-03, or through the backhaul interface unit 6B-04. In addition, the controller 6B-01 records and reads data in the storage unit 6B-02. To this end, the controller 6B-01 may include at least one processor. The controller controls transceiver, storage unit and backhaul interface such that base station operation illustrated in e.g. FIG. 4A are performed.

The storage unit 6B-02 stores data for operation of the main base station, such as a basic program, an application program, and configuration information. Particularly, the storage unit 6B-02 may store information regarding a bearer allocated to an accessed UE, a measurement result reported from the accessed UE, and the like. In addition, the storage unit 6B-02 may store information serving as a criterion to deter mine whether to provide the UE with multi—connection or to discontinue the same. In addition, the storage unit 6B-02 provides stored data at a request of the controller 6B-01.

The transceiver 6B-03 consists of a RF processor, a baseband processor and one or more antennas. The RF processor performs functions for transmitting/receiving signals through a wireless channel, such as signal band conversion, amplification, and the like. Specifically, the RF processor up—converts a baseband signal provided from the baseband processor into an RF band signal, transmits the same through an antenna, and down—converts an RF band signal received through the antenna into a baseband signal. The RF processor may include a transmission filter, a reception filter, an amplifier, a mixer, an oscillator, a DAC, an ADC, and the like. The RF processor may perform a down link MIMO operation by transmitting at least one layer. The baseband processor performs a function of conversion between a baseband signal and a bit string according to the physical layer specification of the first radio access technology. For example, during data transmission, the baseband processor encodes and modulates a transmission bit string, thereby generating complex symbols. In addition, during data reception, the baseband processor demodulates and decodes a baseband signal provided from the RF processor, thereby restoring a reception bit string.

The backhaul interface unit 6B-04 provides an interface for communicating with other nodes inside the network. The backhaul interface unit 6B-04 converts a bit string transmitted from the base station to another node, for example, another base station or a core network, into a physical signal, and converts a physical signal received from the other node into a bit string.

What is claimed is:

1. A method by a terminal, the method comprising:
receiving by the terminal a radio resource control (RRC) reconfiguration message, wherein the RRC reconfiguration message comprises:
a first configuration; and
one or more second configurations, wherein each of the one or more second configurations is associated with an identifier;
receiving by the terminal a medium access control (MAC) control element (CE), wherein the MAC CE comprises a field indicating a specific second configuration based on the identifier;
determining by the terminal one or more radio bearers based on comparison between a third configuration and a fourth configuration, wherein the third configuration is determined based on the first configuration and the specific second configuration; and
releasing by the terminal the one or more radio bearers.

2. The method of claim 1,
wherein the one or more radio bearers are determined based on a specific part of the third configuration and the specific part of the fourth configuration.

3. The method of claim 2,
wherein the specific part is radio bearer identifier.

4. The method of claim 1, the method further comprising:
determining by the terminal one or more radio link control (RLC) bearers based on comparison between a second specific part of the third configuration and the second specific part of the fourth configuration, wherein the second specific part is logical channel identifier; and
releasing by the terminal the one or more RLC bearers.

5. The method of claim 1,
wherein the specific second configuration comprises delta configuration over the first configuration.

6. The method of claim 1, the method further comprising:
transmitting by the terminal a RRC reconfiguration complete message in response to the MAC CE.

7. The method of claim 6,
wherein synchronous reconfiguration procedure caused by the MAC CE is completed in case that uplink grant for new transmission is received after transmission of the RRC reconfiguration complete message.

8. The method of claim 7,
wherein the terminal performs retransmission of a specific set of packet data convergence protocol (PDCP) protocol data units (PDUs) of a specific radio bearer in case that:
no reset identifier of the fourth configuration is not equal to no reset identifier of the specific second configuration; and
radio bearer identifier of the specific radio bearer is part of the fourth configuration.

9. The method of claim 8,
wherein the specific radio bearer is:
radio bearer to transfer internet protocol (IP) packet; and
operating on radio link control (RLC) acknowledged mode (AM).

10. The method of claim 8,
wherein the specific set of PDCP PDUs comprises PDCP PDU:
that is previously submitted to re-established or released AM RLC entities; and
for which successful delivery has not been confirmed.

11. The method of claim 7,
wherein the terminal performs discarding of a second specific set of packet data convergence protocol (PDCP) packets of a second specific radio bearer in case that the MAC CE is received.

12. The method of claim 11,
wherein the second specific set of PDCP packets comprises:
PDCP Service Data Unit in buffer of transmitting PDCP entity;
PDCP PDU in buffer of transmitting PDCP entity; and
PDCP PDU in buffer of receiving PDCP entity.

13. The method of claim 11,
wherein the second specific radio bearer is signaling radio bearer 1.

14. The method of claim 1, wherein:
the fourth configuration is configuration at a specific time; and
the specific time is after a specific RRC message is received and before the MAC CE is received.

15. The method of claim 14,
wherein the specific RRC message is RRC message comprising configuration information of the one or more radio bearers.

16. The method of claim 1,
wherein a radio bearer is released in case that:
the radio bearer is part of the fourth configuration; and
the radio bearer is not part of the third configuration.

17. A terminal comprising:
a transceiver,
a memory, and
a controller coupled to the transceiver and the memory, wherein the controller is configured to cause the terminal to:
receive a radio resource control (RRC) reconfiguration message, wherein the RRC reconfiguration message comprises;
a first configuration; and
one or more second configurations, wherein each of the one or more second configurations is associated with an identifier;
receive a medium access control (MAC) control element (CE), wherein the MAC CE comprises a field indicating a specific second configuration based on the identifier;
determine one or more radio bearers based on comparison between a third configuration and a fourth configuration, wherein the third configuration is determined based on the first configuration and the specific second configuration; and
release the one or more radio bearers.

18. A method by a base station, the method comprising:
transmitting by the base station a radio resource control (RRC) reconfiguration message, wherein the RRC reconfiguration message comprises:
a first configuration; and
one or more second configurations, wherein each of the one or more second configurations is associated with an identifier;
transmitting by the base station a medium access control (MAC) control element (CE), wherein the MAC CE comprises a field indicating a specific second configuration based on the identifier; and releasing by the base station one or more radio bearers, wherein:
   the one or more radio bearers are determined based on comparison between a third configuration and a fourth configuration; and
   the third configuration is determined based on the first configuration and the specific second configuration.

* * * * *